US012306594B2

(12) United States Patent
Chen et al.

(10) Patent No.: US 12,306,594 B2
(45) Date of Patent: May 20, 2025

(54) RECEIVER DEVICE AND EYE PATTERN-BASED CONTROL PARAMETER ADJUSTMENT METHOD

(71) Applicants: Faraday Technology Corporation, Suzhou (CN); Faraday Technology Corp., Hsinchu (TW)

(72) Inventors: Ling Chen, Hsinchu (TW); Prateek Kumar Goyal, Hsinchu (TW); Xiao-Dong Fei, Hsinchu (TW)

(73) Assignees: Faraday Technology Corporation, Suzhou (CN); Faraday Technology Corp., Hsinchu (TW)

( * ) Notice: Subject to any disclaimer, the term of this patent is extended or adjusted under 35 U.S.C. 154(b) by 498 days.

(21) Appl. No.: 17/732,432

(22) Filed: Apr. 28, 2022

(65) Prior Publication Data
US 2023/0244190 A1 Aug. 3, 2023

(30) Foreign Application Priority Data
Jan. 28, 2022 (CN) .......................... 202210106004.2

(51) Int. Cl.
G05B 13/02 (2006.01)
H04B 1/10 (2006.01)

(52) U.S. Cl.
CPC ......... *G05B 13/025* (2013.01); *G05B 13/026* (2013.01); *H04B 1/109* (2013.01)

(58) Field of Classification Search
CPC .... G05B 13/025; G05B 13/026; H04B 1/109; H04B 1/16; H04L 1/205; Y02P 90/02
See application file for complete search history.

(56) References Cited

U.S. PATENT DOCUMENTS 8,958,512 B1 2/2015 Ding et al.
10,326,622 B2 6/2019 Chen et al.
(Continued)

FOREIGN PATENT DOCUMENTS

CN 113472708 10/2021

OTHER PUBLICATIONS

"Office Action of Taiwan Counterpart Application", issued on Jun. 16, 2022, pp. 1-5.

*Primary Examiner* — Zhitong Chen
(74) *Attorney, Agent, or Firm* — JCIPRNET

(57) ABSTRACT

A receiver device and an eye pattern-based control parameter adjustment method are provided. The receiver device includes a receiving circuit and a control circuit. The control circuit performs an iterative operation to determine an optimized control parameter, and updates current control parameters of the receiving circuit to the optimized control parameter after completing the iterative operation. The receiving circuit processes an input signal according to the current control parameters to generate recovered data. The iterative operation includes: updating the current control parameters of the receiving circuit to candidate control parameters; checking a size relationship between an optimized eye mask and a current eye pattern; and increasing the optimized eye mask according to the current eye pattern when the optimized eye mask does not conflict with the current eye pattern, and updating the optimized control parameters to the candidate control parameters corresponding to the new eye mask.

8 Claims, 18 Drawing Sheets

(56) References Cited

U.S. PATENT DOCUMENTS

2008/0175310 A1* 7/2008 Okamura .......... H04L 25/03019
375/232
2015/0318919 A1 11/2015 Dawe
2019/0305898 A1* 10/2019 Mao ........................ H04L 1/203

* cited by examiner

RECEIVER DEVICE AND EYE PATTERN-BASED CONTROL PARAMETER ADJUSTMENT METHOD

CROSS-REFERENCE TO RELATED APPLICATION

This application claims the priority benefit of China application no. 202210106004.2, filed on Jan. 28, 2022. The entirety of the above-mentioned patent application is hereby incorporated by reference herein and made a part of this specification.

BACKGROUND

Technical Field

The invention relates to a receiver device, and particularly relates to an eye pattern-based control parameter adjustment method.

Description of Related Art

Transmitting devices may transmit a signal (an input signal) to a receiver device through a channel. A receiving circuit of the receiver device may process the input signal according to control parameters to generate recovered data. Adaptive algorithms of the existing receiver device for control parameters are mostly based on signal theory, such as a least mean square (LMS) algorithm (for example, an SS-LMS algorithm) that is used to dynamically adjust the control parameters of the receiving circuit. Such algorithms are relatively complex, and a large chip area is required. In addition, due to the interaction between the parameters, the choice of different bandwidths and calibration sequences often lead to different results. It is difficult for the existing receiver device to control a balance among various parameters to obtain a stable optimization result.

SUMMARY

The invention is directed to a receiver device and an eye pattern-based control parameter adjustment method, for determining optimized control parameters of the receiving circuit.

In an embodiment of the invention, the eye pattern-based control parameter adjustment method includes: performing an iterative operation by a control circuit to determine an optimized control parameter; and updating a current control parameter of a receiving circuit to the optimized control parameter after completing the iterative operation. The iterative operation includes: updating the current control parameter of the receiving circuit to a candidate control parameter, so that the receiving circuit processes an input signal according to the current control parameter to generate recovered data; checking a relationship between the size of an optimized eye mask and the size of a current eye pattern corresponding to the recovered data; maintaining the optimized eye mask and the optimized control parameter corresponding to the optimized eye mask when the optimized eye mask conflicts with the current eye pattern; and generating a new eye mask larger than the optimized eye mask according to the current eye pattern, updating the optimized eye mask to the new eye mask, and updating the optimized control parameter to the candidate control parameter corresponding to the new eye mask when the optimized eye mask does not conflict with the current eye pattern.

In an embodiment of the invention, the receiver device includes a receiving circuit and a control circuit. The receiving circuit processes an input signal according to a current control parameter to generate recovered data. The control circuit is coupled to the receiving circuit to provide the current control parameter. The control circuit performs an iterative operation to determine an optimized control parameter, and updates a current control parameter of the receiving circuit to the optimized control parameter after completing the iterative operation. The iterative operation includes: updating the current control parameter of the receiving circuit to a candidate control parameter; checking the relationship between the size of an optimized eye mask and the size of a current eye pattern corresponding to the recovered data; maintaining the optimized eye mask and the optimized control parameter corresponding to the optimized eye mask when the optimized eye mask conflicts with the current eye pattern; and when the optimized eye mask does not conflict with the current eye pattern, generating a new eye mask larger than the optimized eye mask according to the current eye pattern, updating the optimized eye mask to the new eye mask, and updating the optimized control parameter to the candidate control parameter corresponding to the new eye mask.

Based on the above description, the receiver device of the embodiments of the invention may perform an eye pattern-based control parameter adjustment method. The control circuit may compare the optimized eye mask with the current eye pattern. When the optimized eye mask is smaller than the current eye pattern (i.e., the optimized eye mask is completely within an enclosed area formed by an inner boundary of the current eye pattern), the control circuit may increase the optimized eye mask according to the current eye pattern. The control circuit may sweep a plurality of candidate control parameters to find the candidate control parameter with the largest eye mask to serve as the optimized control parameter.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
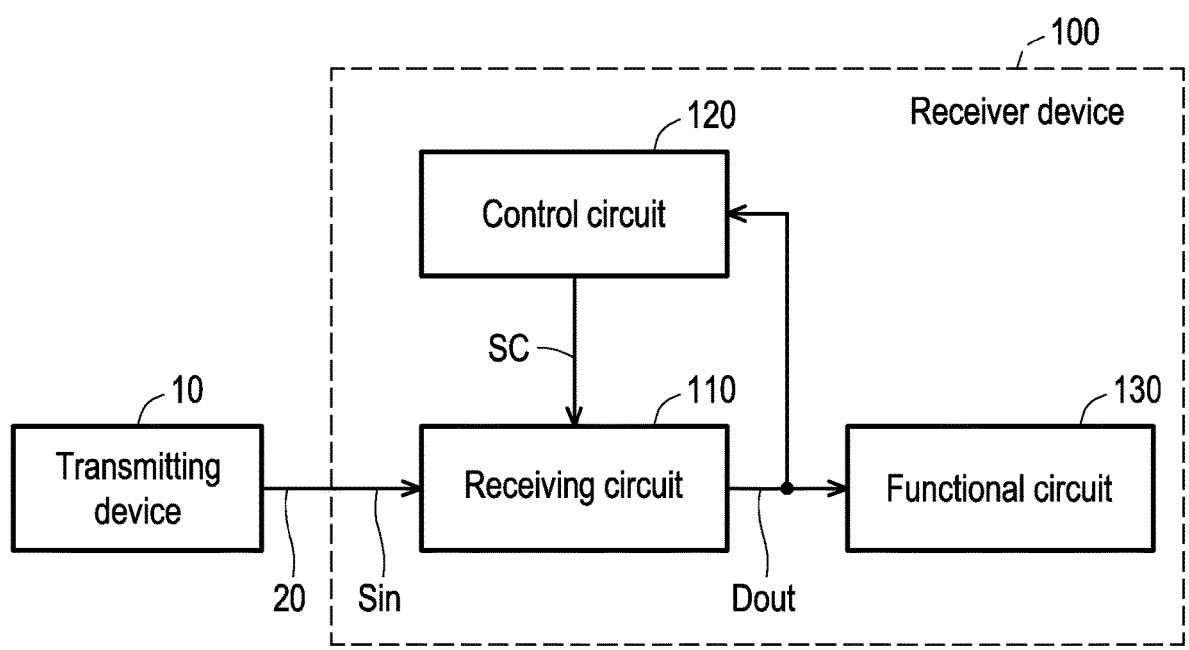
FIG. 1 is a circuit block schematic diagram of a receiver device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

A term "couple" used in the full text of the disclosure (including the claims) refers to any direct and indirect connections. For example, if a first device is described to be coupled (or connected) to a second device, it is interpreted as that the first device is directly coupled to the second device, or the first device is indirectly coupled to the second device through other devices or connection means. "first", "second", etc., mentioned in the specification and the claims are merely used to name discrete elements and should not be regarded as limiting an upper or lower bound of the number of the elements, nor is it used to define a manufacturing order or setting order of the elements. Moreover, wherever possible, components/members/steps using the same referential numbers in the drawings and description refer to the same or like parts. Components/members/steps using the same referential numbers or using the same terms in different embodiments may cross-refer related descriptions.

FIG. 1 is a circuit block schematic diagram of a receiver device 100 according to an embodiment of the invention. A transmitting device 10 may transmit a signal (an input signal Sin) to the receiver device 100 through a channel 20. In the embodiment shown in FIG. 1, the receiver device 100 includes a receiving circuit 110, a control circuit 120 and a functional circuit 130. The control circuit 120 is coupled to the receiving circuit 110 to provide a current control parameter SC. The receiving circuit 110 may process the input signal Sin of the channel 20 according to the current control parameter SC to generate recovered data Dout to the functional circuit 130. Implementation details of the receiving circuit 110 and the functional circuit 130 are not limited by the embodiment. For example, in some embodiments, the receiving circuit 110 may include an on die termination load circuit, a decision feedback equalizer (DFE), a variable gain amplifier (VGA), a continuous time linear equalizer (CTLE), a serial to parallel (S2P) converter, a clock data recovery (CDR) circuit, a phase interpolator (PI), and/or others receiving interface circuits.

Figure 2:
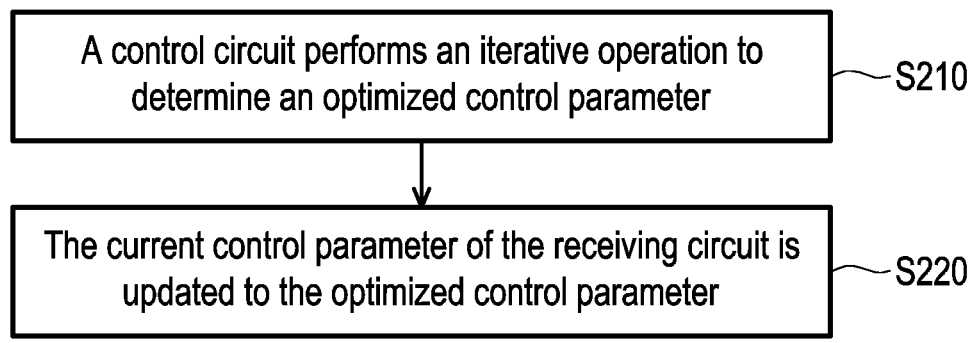
FIG. 2 is a schematic flowchart of an eye pattern-based control parameter adjustment method according to an embodiment of the invention.

FIG. 2 is a schematic flowchart of an eye pattern-based control parameter adjustment method according to an embodiment of the invention. Referring to FIG. 1 and FIG. 2, in step S210, the control circuit 120 may perform an iterative operation based on an eye pattern to determine an optimized control parameter. The control circuit may sweep a plurality of candidate control parameters in the iterative operation to find the candidate control parameter with the largest eye mask as the optimized control parameter. After the iterative operation is completed, the control circuit 120 may update the current control parameter SC of the receiving circuit 110 to the optimized control parameter (step S220). Therefore, the receiving circuit 110 may process the input signal Sin of the channel 20 according to the optimized control parameter to generate the recovered data Dout to the functional circuit 130.

Figure 3:
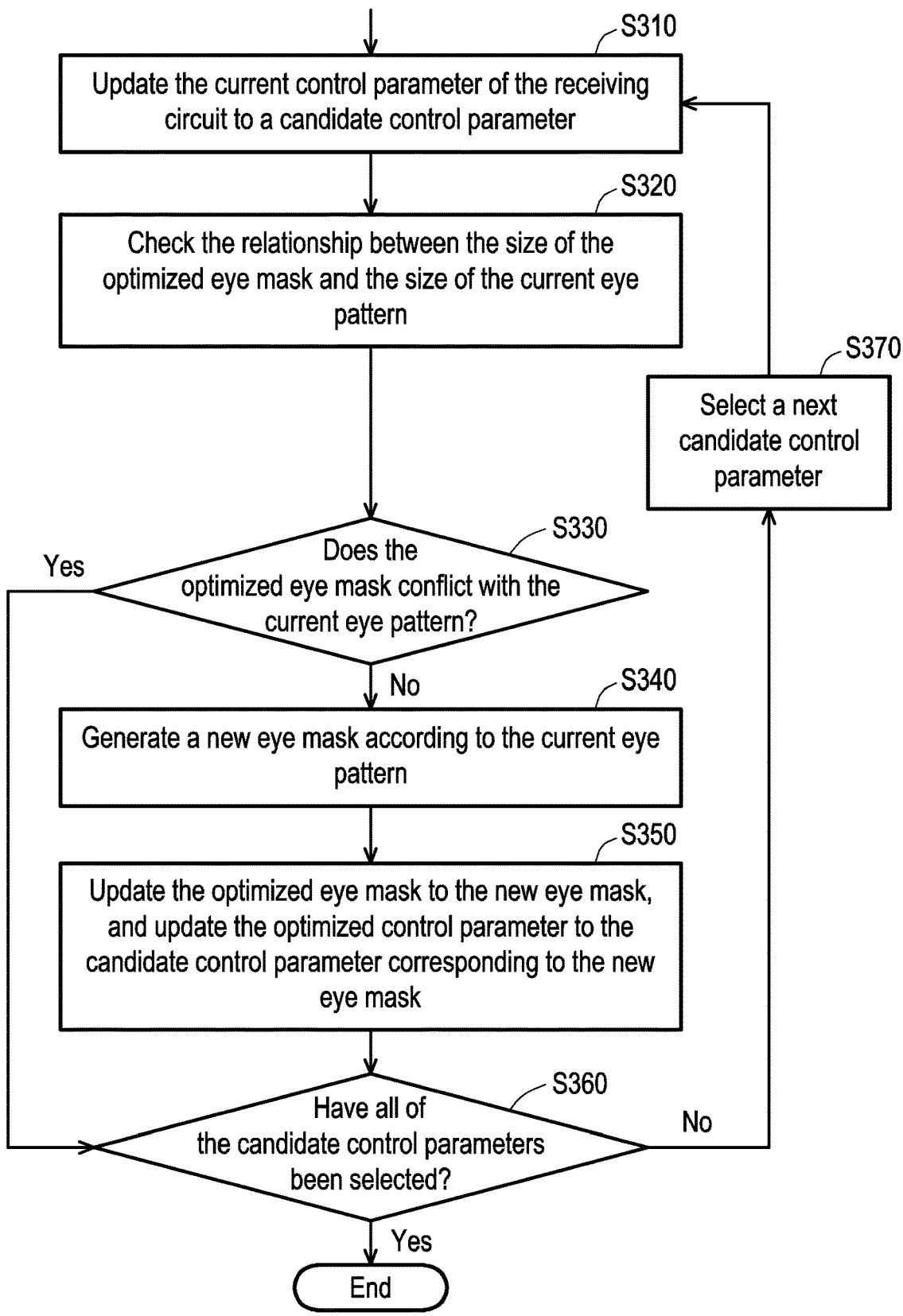
FIG. 3 is a schematic flowchart of an eye pattern-based iterative operation according to an embodiment of the invention.

FIG. 3 is a schematic flowchart of an eye pattern-based iterative operation according to an embodiment of the invention. For the iterative operation described in step S210 of FIG. 2, reference may be made to the related description of FIG. 3. Referring to FIG. 1 and FIG. 3, in step S310, the control circuit 120 may update the current control parameter SC of the receiving circuit 110 to any candidate control parameter, so that the receiving circuit 110 processes the input signal Sin according to the current control parameter SC to generate the recovered data Dout. In step S320, the control circuit 120 may check the relationship between the size of an optimized eye mask and the size of a current eye pattern corresponding to the recovered data Dout. In a first iteration of the iterative operation, the "optimized eye mask" may be set to a certain initial eye mask. For example, the initial eye mask may be a minimum eye mask determined according to an actual design. Corresponding to the initial eye mask, in the first iteration of the iterative operation, the "optimized control parameter" may be set as an initial control parameter, and the initial control parameter may be determined according to the actual design.

Figure 4:
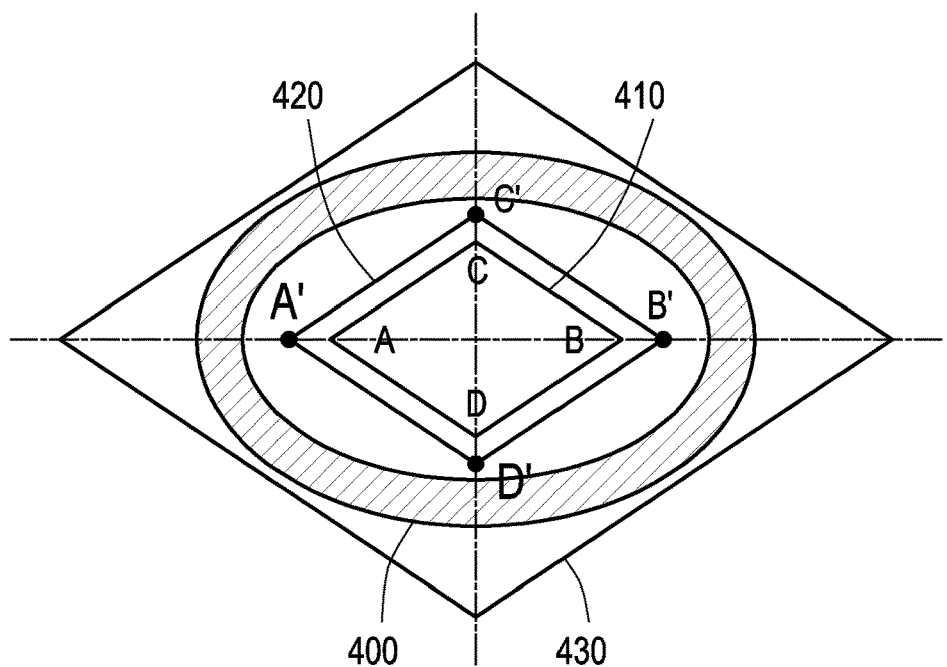
FIG. 4 is a schematic diagram of a current eye pattern and an optimized eye mask according to an embodiment of the invention.
Figure 5:
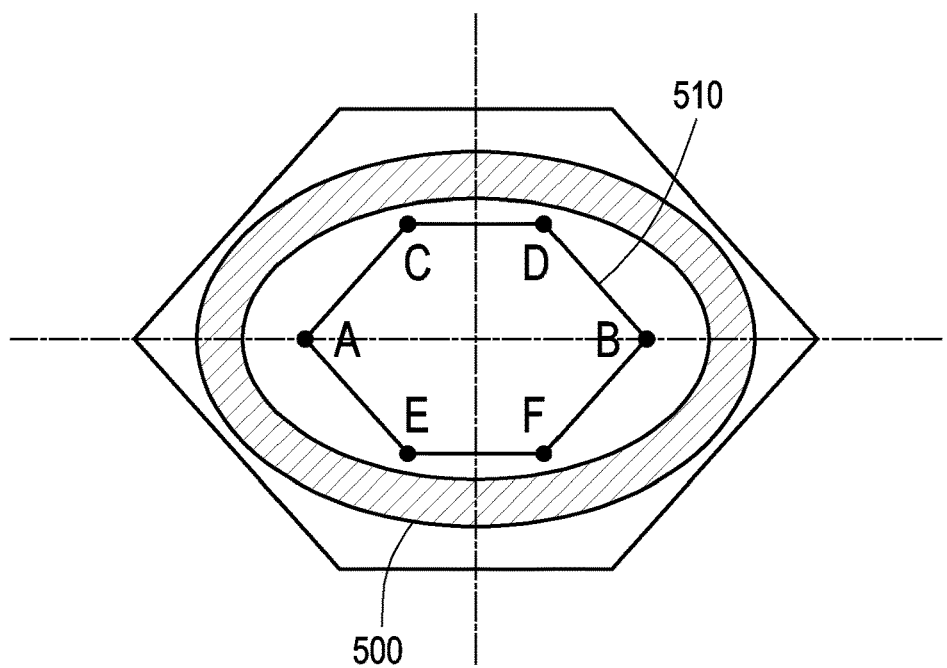
FIG. 5 is a schematic diagram of a current eye pattern and an optimized eye mask according to another embodiment of the invention.

FIG. 4 is a schematic diagram of a current eye pattern 400 and an optimized eye mask 410 according to an embodiment of the invention. In the embodiment shown in FIG. 4, a geometric shape of the optimized eye mask 410 is a diamond, and vertices of the diamond (the optimized eye mask 410) shown in FIG. 4 are respectively labeled as A, B, C, and D. In other embodiments, the optimized eye mask 410 may be a rectangle, an oval, or other geometric shapes. For example, FIG. 5 is a schematic diagram of a current eye pattern 500 and an optimized eye mask 510 according to another embodiment of the invention. In the embodiment of FIG. 5, a geometric shape of the optimized eye mask 510 is a hexagon, and vertices of the hexagon (the optimized eye mask 510) shown in FIG. 5 are respectively labeled as A, B, C, D, E, and F. The current eye pattern 500 and the optimized eye mask 510 shown in FIG. 5 may be deduced with reference to the related descriptions of the current eye pattern 400 and the optimized eye mask 410 shown in FIG. 4.

Refer to FIG. 1, FIG. 3 and FIG. 4. In step S320, the control circuit 120 may check the relationship between the size of the optimized eye mask 410 and the size of the current eye pattern 400 corresponding to the recovered data Dout. For example, the control circuit 120 may check whether each of the vertices A, B, C, and D of the optimized eye mask 410 exceeds an inner boundary of the current eye pattern 400. When any one of the vertices A, B, C, and D exceeds the inner boundary of the current eye pattern 400, the control circuit 120 may determine that the optimized eye mask 410 conflicts with the current eye pattern 400. When the optimized eye mask 410 conflicts with the current eye pattern 400 (a determination result of step S330 is "Yes"), the control circuit 120 may maintain the optimized eye mask 410 and the optimized control parameter corresponding to the optimized eye mask 410, and perform step S360. When the optimized eye mask 410 does not conflict with the current eye pattern 400 (the determination result of step S330 is "No"), the control circuit 120 may perform step S340 to generate a new eye mask 420 larger than the optimized eye mask 410 according to the current eye pattern 400. Vertices of the new eye mask 420 shown in FIG. 4 are respectively labeled as A', B', C', and D'. In step S350, the control circuit 120 may update the optimized eye mask 410 to the new eye mask 420, and update the optimized control parameter to the candidate control parameter corresponding to the new eye mask 420.

In step S360, the control circuit 120 may determine whether all of the candidate control parameters have been selected. When there are still candidate control parameters that have not been selected (the determination result of step S360 is "No"), the control circuit 120 may execute step S370. In step S370, the control circuit 120 may select a next candidate control parameter from the unselected candidate control parameters, so as to perform steps S310-S360 again.

Based on the above description, the receiver device 100 of the embodiments of the invention may perform the eye pattern-based control parameter adjustment method. The control circuit 120 may compare the optimized eye mask 410 with the current eye pattern 400. When the optimized eye mask 410 is smaller than the current eye pattern 400 (i.e., the optimized eye mask 410 is completely located within the enclosed area formed by the inner boundary of the current eye pattern 400), the control circuit 120 may enlarge the optimized eye mask 410 according to the current eye pattern 400. The control circuit 120 may sweep the plurality of candidate control parameters to find the candidate control parameter with the largest eye mask as the optimized control parameter.

Figure 6:
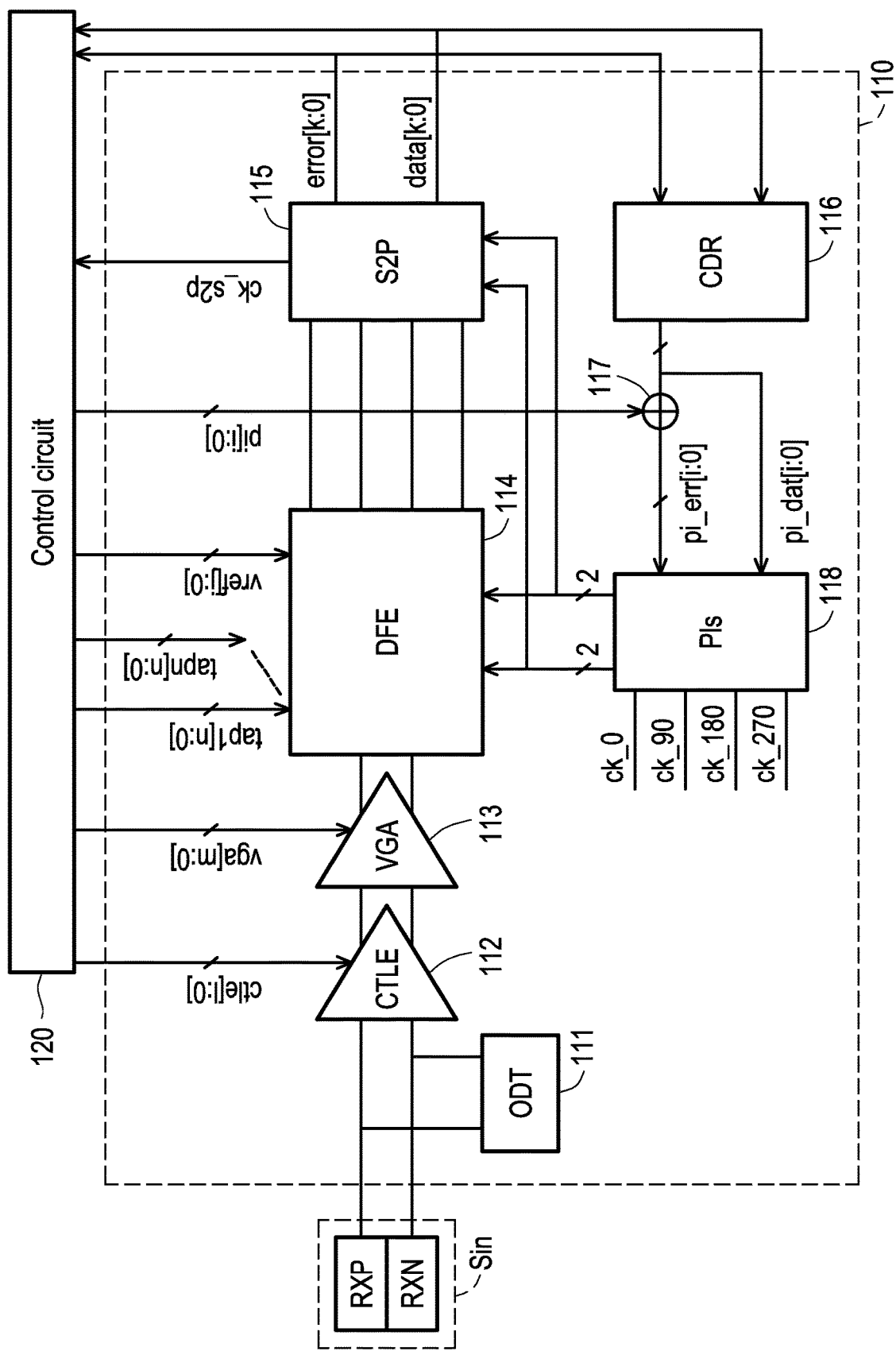
FIG. 6 is a schematic circuit block diagram of the receiving circuit shown in FIG. 1 according to an embodiment of the invention.

According to the actual design, the receiving circuit 110 may be any signal receiving interface circuit. For example, FIG. 6 is a schematic circuit block diagram of the receiving circuit 110 shown in FIG. 1 according to an embodiment of the invention. In the embodiment of FIG. 6, the receiving circuit 110 includes an on-die termination (ODT) load circuit 111, a continuous time linear equalizer (CTLE) 112, a variable gain amplifier (VGA) 113, a decision feedback equalizer (DFE) 114, a serial to parallel (S2P) converter 115, a clock data recovery (CDR) circuit 116, an adder circuit 117, and a phase interpolator (PIs) 118. An input terminal of the CTLE 112 receives differential signals RXP and RXN (the input signal Sin) from the channel 20. A control terminal of the CTLE 112 is coupled to the control circuit 120 to receive a control parameter ctle[1:0] (a control parameter in the current control parameters SC). An output terminal of the CTLE 112 is coupled to an input terminal of the VGA 113. A control terminal of the VGA 113 is coupled to the control circuit 120 to receive a control parameter vga[m:0] (a control parameter in the current control parameters SC). An output terminal of the VGA 113 is coupled to an input terminal of the DFE 114.

In the embodiment of FIG. 6, the DFE 114 is an n-tap DFE, where n may be any integer determined according to an actual design. A control terminal of the DFE 114 is coupled to the control circuit 120 to receive control parameters tap1[n:0], . . . , tapn[n:0] (n control parameters in the current control parameters SC) and a control parameter vref[j:0] (a control parameter in the current control parameter SC). An output terminal of DFE 114 is coupled to an input terminal of the S2P converter 115. The S2P converter 115 outputs parallel data error[k:0] and data[k:0] (the recovered data Dout) to the functional circuit 130 and the control circuit 120.

An input terminal of the CDR circuit 116 is coupled to an output terminal of the S2P converter 115 to receive the parallel data error[k:0] and data[k:0]. The adder circuit 117 and the phase interpolator 118 are coupled to an output terminal of the CDR circuit 116 to receive a control signal pi_dat[i:0]. The adder circuit 117 is further coupled to the control circuit 120 to receive a control parameter pi[i:0] (a control parameter in the current control parameters SC). The phase interpolator 118 is further coupled to the adder circuit 117 to receive a control signal pi_err[i:0]. The phase interpolator 118 generates sampling clocks for the DFE 114 and the S2P converter 115 according to clock signals ck_0, ck_90, ck_190 and ck_270 of different phases.

Figure 7:
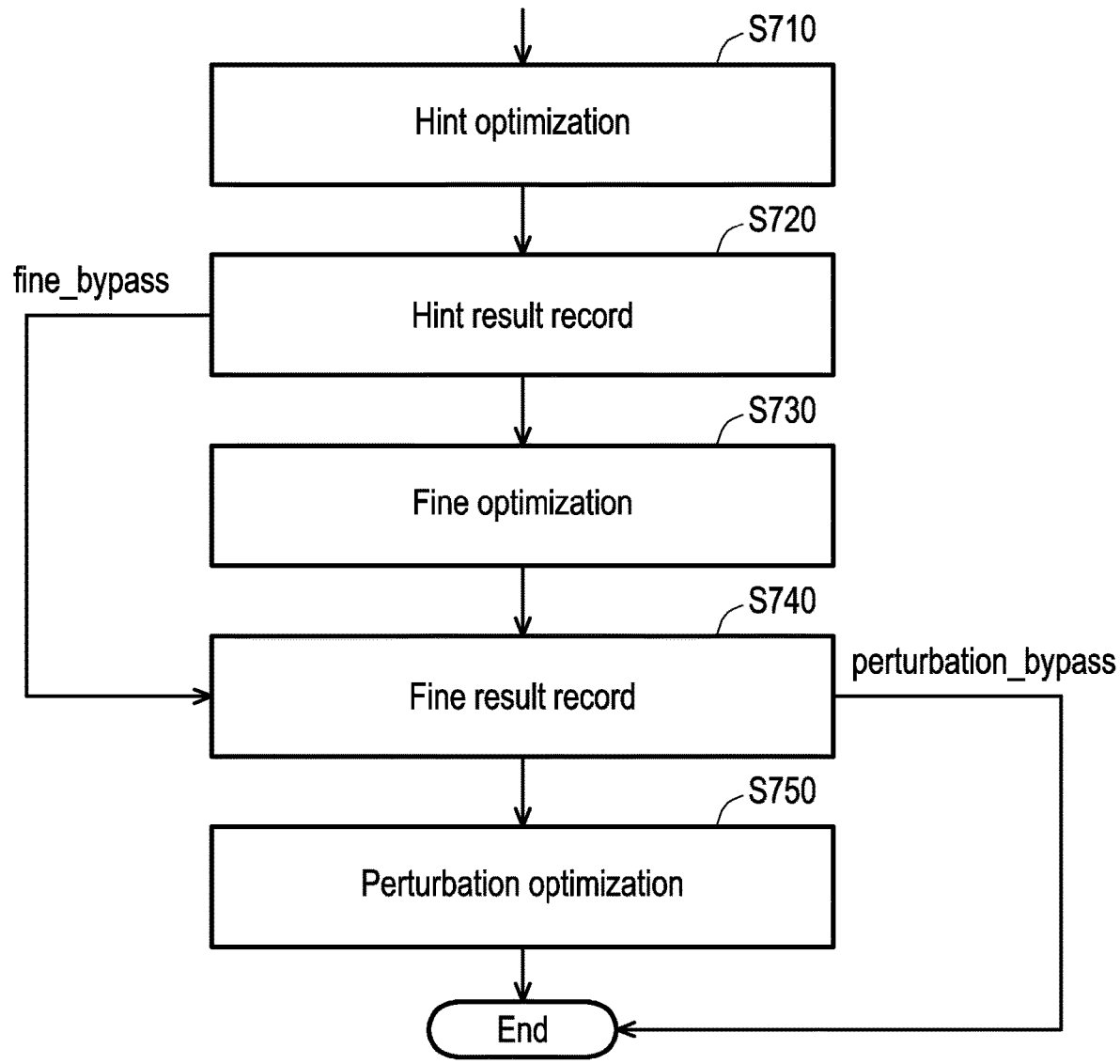
FIG. 7 is a schematic state flowchart of an eye pattern-based control parameter optimization method according to an embodiment of the invention.

FIG. 7 is a schematic state flowchart of an eye pattern-based control parameter optimization method according to an embodiment of the invention. The embodiment shown in FIG. 7 includes two foreground optimization states and one background optimization state. The foreground optimization includes hint optimization of a state S710 and fine optimization of a state S730. The foreground optimization may use training data to perform control parameter optimization. The hint optimization of the state S710 will be described in detail in the embodiment of FIG. 8. After the state S710 is completed, a state S720 is entered to generate a hint result record. The hint result record (a result generated by the state S710) will be used as an initial value of a next optimization state (the state S730). The fine optimization of the state S730 will be detailed in the embodiment of FIG. 16. After the state S730 is completed, a state S740 is entered to generate a fine result record. The fine result record (a result generated by the state S730) may serve as an initial value of a next optimization state (a state S750). The background optimization state includes perturbation optimization of the state S750. The perturbation optimization of the state S750 will be detailed in the embodiment shown in FIG. 17. After the receiver device 100 enters normal data transmission and reception, the background optimization is activated, and kept working all the time (or optionally turned off). The background optimization state may use normal transmission data for control parameter optimization.

According to different configurations, either the state S730 (the fine optimization) or the state S750 (the perturbation optimization) may be bypassed. For example, when a parameter fine_bypass in FIG. 7 is 1, the fine optimization (the state S730) is not executed. Similarly, when a parameter perturbation_bypass in FIG. 7 is 1, the perturbation optimization (the state S750) is not executed. When the fine optimization is bypassed, the fine result record recorded by the state S740 is the hint result record recorded by the state S720, which includes an optimal parameter index after the hint optimization and the corresponding optimized eye mask.

Figure 8:
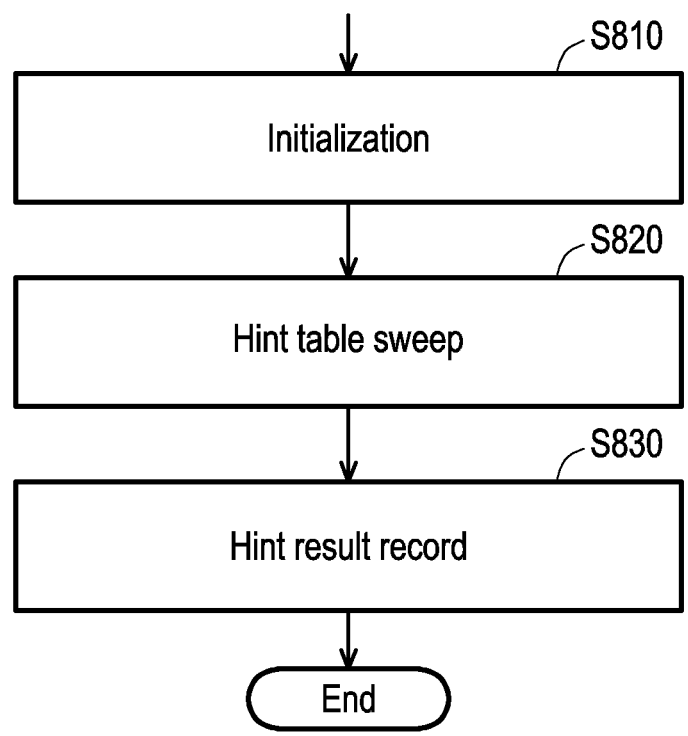
FIG. 8 is a schematic state flowchart of hint optimization of FIG. 7 according to an embodiment of the invention.

FIG. 8 is a schematic state flowchart of the hint optimization (the state S710) of FIG. 7 according to an embodiment of the invention. The hint optimization shown in FIG. 8 (i.e., the state S710 shown in FIG. 7) may be used to search for an optimal set among several sets of predetermined parameter value combinations to serve as an initial parameter value of the subsequent fine optimization (i.e., the state S730 shown in FIG. 7). The control circuit 120 may perform the hint optimization shown in FIG. 8 to call a table sweep state machine to sweep a predetermined hint table (for example, a following table 1). The table sweep state machine will be described in detail in the embodiment of FIG. 9. The hint table shown in table 1 includes a hint index field index_hint and a plurality of parameter index fields Index_vga, Index_ctle, Index_dfe, . . . The hint table shown in table 1 exemplarily displays 16 sets of data, where hint indexes index_hint of the 16 sets of data are 0, . . . , 15, respectively. The number of data sets in the hint table may be determined according to an actual design. Each set of data of the hint table contains multiple parameter indexes. For example, a parameter index combination indicated by a hint index "0" includes parameter indexes "Index_vga_0", "Index_ctle_0", "Index_dfe_0", . . . . Similarly, it may be deduced that a parameter index combination indicated by a hint index "15" includes parameter indexes "Index_vga_15", "Index_ctle_15", "Index_dfe_15", . . . . "Index_vga_0", "Index_ctle_0", "Index_dfe_0", "Index_vga_15", "Index_ctle_15" and "Index_dfe_15" shown in table 1 respectively represent arbitrary integers determined according to the actual design.

TABLE 1

| index_hint | Index_vga (VGA table) | Index_ctle (CTLE table) | Index_dfe (DFE table) | ... |
|---|---|---|---|---|
| hint table | | | | |
| 0 | Index_vga_0 | Index_ctle_0 | Index_dfe_0 | ... |
| . | . | . | . | ... |
| . | . | . | . | |
| . | . | . | . | |
| 15 | Index_vga_15 | Index_ctle_15 | Index_dfe_15 | ... |

The different parameter index fields of table 1 record the indexes of different control parameter tables, and the different control parameter tables are used to record control parameters of different component circuits of the receiving circuit 110. For example, the parameter index field Index_vga shown in table 1 records index values in an index field Index_vga of a VGA table (a control parameter table) shown in a following table 2; the parameter index field Index_ctle shown in table 1 records index values in an index field Index_ctle of a CTLE table (a control parameter table) shown in a following table 3; and the parameter index field Index_dfe shown in table 1 records index values in an index field Index_dfe of a DFE table (a control parameter table) shown in a following table 4. The VGA table shown in table 2 is used to record control parameters vga[m:0] of the VGA 113. For example, the control parameter vga[m:0] indicated by an index "0" shown in table 2 is "vga_0", and the control parameter vga[m:0] indicated by an index "15" shown in table 2 is "vga_15". "vga_0" and "vga_15" shown in table 2 respectively represent arbitrary real numbers determined according to the actual design. The CTLE table shown in table 3 is used to record control parameters ctle[1:0] of the CTLE 112. For example, the control parameter ctle[1:0] indicated by the index "0" shown in table 3 is "ctle_0", and the control parameter ctle[1:0] indicated by the index "15" shown in table 3 is "ctle_15". "ctle_0" and "ctle_15" shown in table 3 respectively represent arbitrary real numbers determined according to the actual design. The DFE table shown in table 4 is used to record control parameters tap1[n:0] of the DFE 114. For example, the control parameter tap1[n:0] indicated by the index "0" shown in table 4 is "tap1_0", and the control parameter tap1[n:0] indicated by the index "15" shown in table 4 is "tap1_15". "tap1_0" and "tap1_15" shown in table 4 respectively represent arbitrary real numbers determined according to the actual design.

TABLE 2

| Index_vga | vga[m:0] |
|---|---|
| VGA table (control parameter table) | |
| 0 | vga_0 |
| . | . |
| . | . |
| . | . |
| 15 | vga_15 |

TABLE 3

| Index_ctle | ctle[1:0] |
|---|---|
| CTLE table (control parameter table) | |
| 0 | ctle_0 |
| . | . |
| . | . |
| . | . |
| 15 | ctle_15 |

TABLE 4

| Index_dfe | tap1[n:0] |
|---|---|
| DFE table (control parameter table) | |
| 0 | tap1_0 |
| . | . |
| . | . |
| 15 | tap1_15 |

According to a size of the current eye pattern 400 set by any parameter index combination (control parameter combination) indicated by the hint index field index_hint of the hint table shown in table 1, the table sweep state machine may search for one control parameter combination with the best performance. An initialization operation of a state S810 shown in FIG. 8 is used to set a starting hint index, an ending hint index and a hint index step related to the hint index field index_hint in the hint table shown in table 1. The state S810 may also set the "optimized eye mask" as a predetermined initial eye mask, and the initial eye mask may be determined according to the actual design. The hint table sweep operation of the state S820 may call the table sweep state machine (referring to the description of FIG. 9 for details) to sweep the hint table shown in table 1, so as to perform the iterative operation on the hint table shown in table 1. For example, the control circuit 120 may select one (which is referred to as a "selected hint index" hereinafter) from a plurality of hint indexes (for example, 0 to 15, but the invention is not limited thereto) in the hint index field index_hint shown in table 1 according to the starting hint index, the ending hint index and the hint index step. The control circuit 120 may extract a plurality of parameter indexes corresponding to the selected hint index from the plurality of parameter index fields Index_vga, Index_ctle and Index_dfe of the hint table shown in table 1, where the parameter indexes indicate a plurality of control parameters in the plurality of control parameter tables. The control circuit 120 may use the plurality of control parameters in the control parameter tables indicated by the parameter indexes as the candidate control parameters described in FIG. 3.

For example, the control circuit 120 may select the hint index "0" from the hint index field index_hint shown in table 1, and then extract the parameter indexes Index_vga_0, Index_ctle_0 and Index_dfe_0 corresponding to the selected hint index "0" from the plurality of parameter index fields Index_vga, Index_ctle and Index_dfe of the hint table shown in table 1. Here, it is assumed (but not limited to) that the parameter indexes Index_vga_0, Index_ctle_0 and Index_dfe_0 are all the index value "0". The control circuit 120 may use the control parameter vga_0 in the VGA table (the control parameter table) shown in table 2 that is indicated by the index value "0" of the parameter index field Index_vga as a parameter of the candidate control parameters described in FIG. 3. The control circuit 120 may use the control parameter ctle_0 in the CTLE table (the control parameter table) shown in table 3 that is indicated by the index value "0" of the parameter index field Index_ctle as a parameter of the candidate control parameters described in FIG. 3. The control circuit 120 may use the control parameter tap1_0 in the DFE table (the control parameter table) shown in table 4 that is indicated by the index value "0" of the parameter index field Index_dfe as a parameter of the candidate control parameters described in FIG. 3.

After sweeping the plurality of hint indexes in the hint index field index_hint of the hint table shown in table 1, the control circuit 120 may search for a set of parameter index combination adapted to provide the largest eye pattern to serve as the optimized hint index. After the state S820 is completed, the control circuit 120 may enter a state S830 to generate a hint result record. The hint result record recorded by the state S830 (the optimized eye mask 410 and the optimized control parameter corresponding to the optimized eye mask 410 found by the state S820) may be for the use of the following state S730 (the fine optimization).

Figure 9:
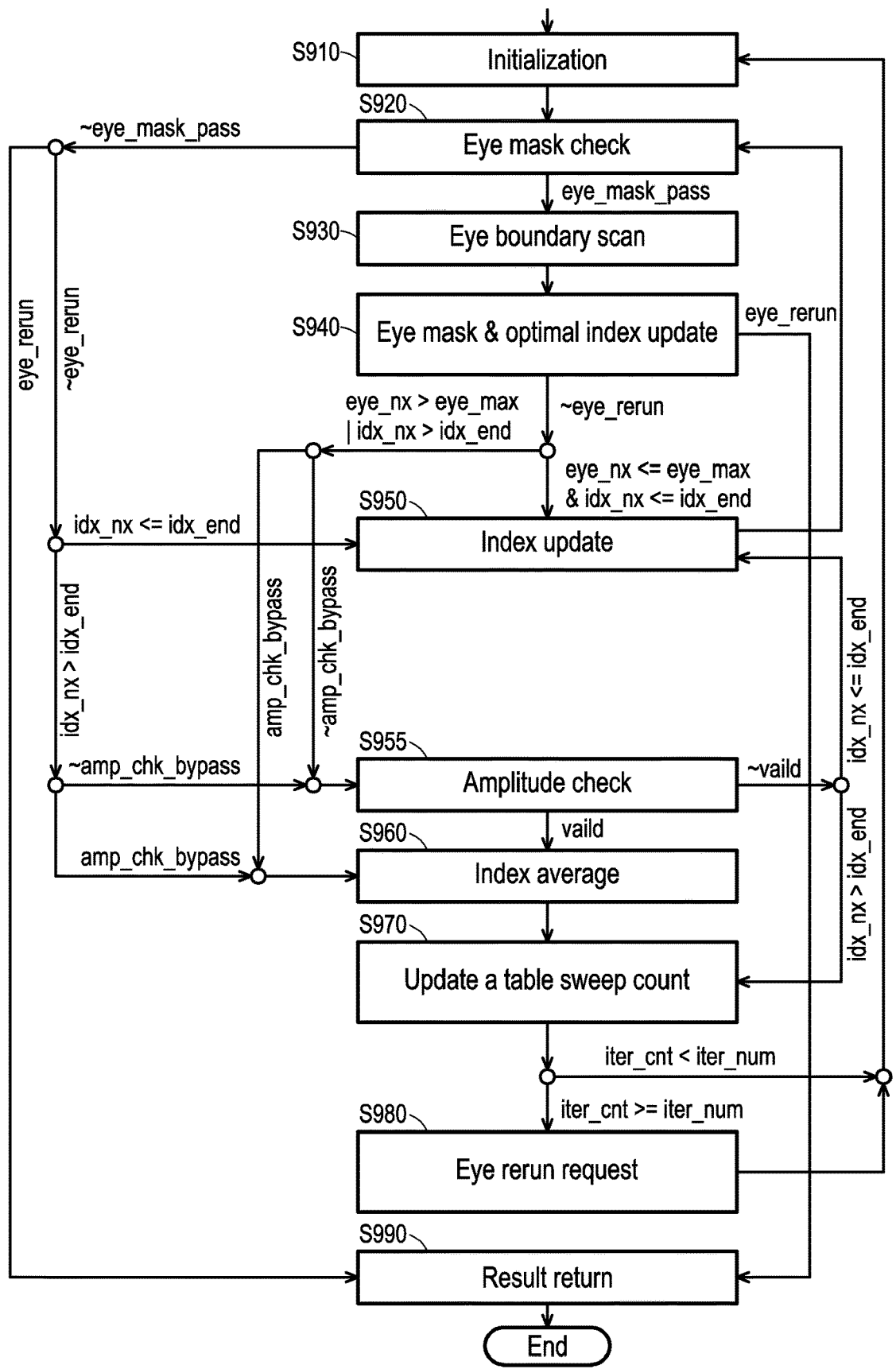
FIG. 9 is a schematic state flowchart of a table sweep state machine according to an embodiment of the invention.

FIG. 9 is a schematic state flowchart of a table sweep state machine according to an embodiment of the invention. The table sweep operation performed on different control parameter tables by the state S820 shown in FIG. 8 (the hint table sweep operation) and the state S730 shown in FIG. 7 (refer to the embodiment shown in FIG. 15 for details) may both call the table sweep state machine shown in FIG. 9 to search for an optimal value of each parameter. When the state S820 shown in FIG. 8 calls the table sweep state machine shown in FIG. 9, a sweeping object (a target table) of the table sweep state machine is the hint table shown in table 1. When the table sweep operation of the embodiment shown in FIG. 15 calls the table sweep state machine shown in FIG. 9, the sweeping object (the target table) of the table sweep state machine is the control parameter tables shown by table 2, table 3 or table 4. According to a state (a parent state) of calling the table sweep state machine, an initialization operation of the state S910 shown in FIG. 9 may be to set/load a starting index, an ending index, an index step and an initial eye mask related to the target table.

After completing loading the initial values (state S910), the control circuit 120 may enter a state S920 to perform an eye mask check operation. The state S920 may call an eye mask check state machine to check whether the current eye pattern 400 under the current parameter index setting may pass the check of the optimized eye mask 410. For example, the state S920 may compare the current eye pattern 400 with the optimized eye mask 410. If the current eye pattern 400 is greater than or equal to the optimized eye mask 410, the control circuit 120 may consider the check of the state S920 to be passed (otherwise, the control circuit 120 considers the check to be failed). The related description of the embodiment shown in FIG. 10 may be referred for details of the eye mask check state machine called by the state S920.

Figure 10:
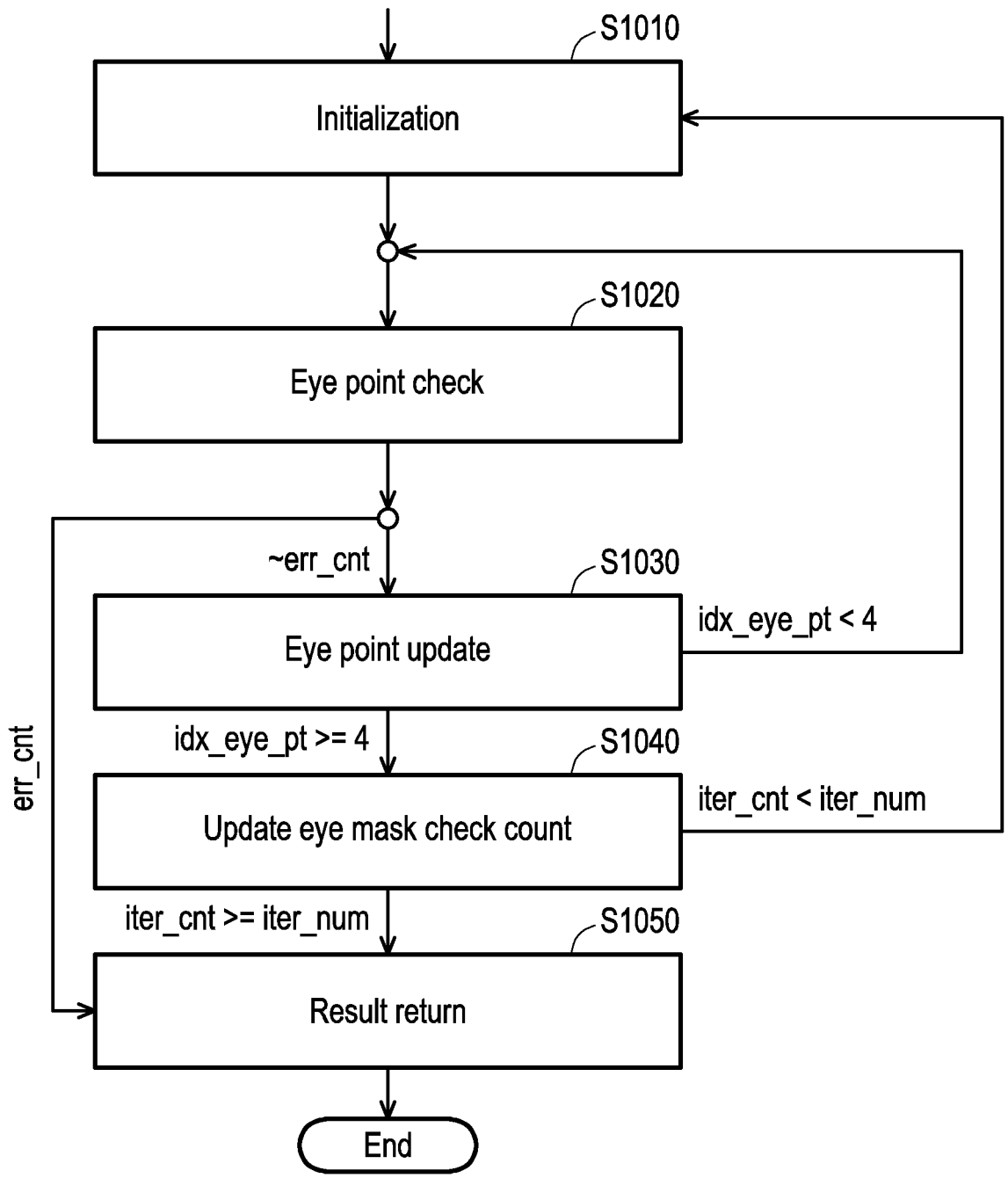
FIG. 10 is a schematic state flowchart of an eye mask check state machine according to an embodiment of the invention.

FIG. 10 is a schematic state flowchart of an eye mask check state machine according to an embodiment of the invention. An initialization operation of a state S1010 shown in FIG. 10 may be to set the initial eye mask to the current eye mask (for example, the optimized eye mask shown in FIG. 4) in the state (the parent state) that calls the eye mask check state machine. Referring to FIG. 4 and FIG. 10, the control circuit 120 may perform eye point check in a state S1020. The state S1020 may check whether one of (a current eye point) the vertices (eye points) A, B, C, and D of the optimized eye mask 410 is inside the inner boundary of the current eye pattern 400. For example, the state S1020 may call an eye point check state machine shown in FIG. 11 to perform the eye point check on the current eye point of the optimized eye mask 410.

Figure 11:
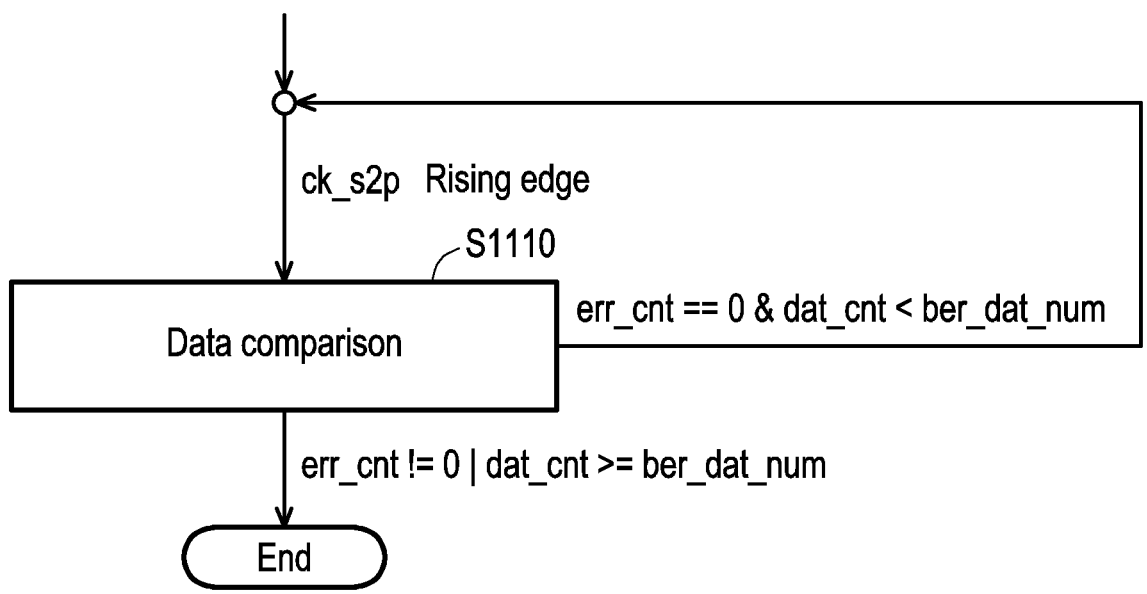
FIG. 11 is a schematic state flowchart of an eye point check state machine according to an embodiment of the invention.

FIG. 11 is a schematic state flowchart of an eye point check state machine according to an embodiment of the invention. Referring to FIG. 4 and FIG. 11, the eye point check state machine shown in FIG. 11 is used to check whether the parallel data[k:0], error[k:0] (recovered data Dout) output by the receiving circuit 110 on the vertices (eye points) A, B, C and D of the optimized eye mask 410 is the same. Whenever a rising edge of a clock signal ck_s2p output by the S2P converter 115 comes, the control circuit 120 may enter a state S1110 to perform a data comparison operation. The state S1110 is used to compare whether corresponding bits of the parallel data data[k:0] and error [k:0] are consistent, and accumulate a number of inconsistent bits, i.e., err_cnt=sum(data[19:0]^error[19: 0])+err_cnt, where err_cnt is an inconsistent bit counting value. data_cnt shown in FIG. 11 is an accumulated value of a bit number of the parallel data data[k:0], i.e., dat_cnt=dat_cnt+(k+1). It is assumed that the parallel data data[k: 0] is 20-bit data, i.e., it is assumed that k is 19 (data[19: 0]), the accumulated value dat_cnt=data_cnt+20. If the control circuit 120 determines that the accumulated value dat_cnt is smaller than a threshold ber_dat_num (the threshold ber_dat_num may be determined according to the actual design) and the inconsistent bit counting value err_cnt is 0, the control circuit 120 may perform the comparison of a next round (a next clock cycle). If the accumulated value dat_cnt is greater than or equal to the threshold ber_dat_num or the inconsistent bit counting value err_cnt is not 0, the eye point check state machine may enter an ending state (return to the parent state).

Referring to FIG. 10, after the state S1020 is completed, the control circuit 120 may check the inconsistent bit counting value err_cnt. When the vertices (the eye points) A, B, C and D of the optimized the eye mask 410 are inside the inner boundary of the current eye pattern 400 (err_cnt is 0), the control circuit 120 may enter a state S1030 to perform an eye point updating operation. Otherwise, the control circuit 120 may enter a state S1050 to perform a result return operation. The state S1030 is used to update a current eye point to perform checking of a next eye point. I f sweeping of all of the vertices (eye points) A, B, C and D on the optimized eye mask 410 is not completed (a pointer idx_eye_pt is less than 4), the control circuit 120 may enter the state S1020 again to perform the eye point check on the next eye point. If sweeping of all of the vertices (eye points) A, B, C and D on the optimized eye mask 410 is completed (the pointer idx_eye_pt is greater than or equal to 4), the control circuit 120 may enter a state S1040 to update an eye mask check count. The state S1040 records a number of times that the entire "eye mask check" process is repeatedly executed to generate a counting value iter_cnt. If the counting value iter_cnt is smaller than a predetermined number of iterations (a threshold iter_num), the entire "eye mask check" process is continuously repeated until the predetermined number of iterations is completed (a counting value inter_cnt is greater than or equal to the threshold iter_num). When the counting value inter_cnt is greater than or equal to the threshold iter_num, the control circuit 120 may enter the state S1050 to return the result of "eye mask check" of the eye mask check state machine to the parent state. If the result of "eye mask check" is passed, a parameter eye_mask_pass is set to 1, otherwise the parameter eye_mask_pass is set to 0.

Referring to FIG. 9, if the checking result of the state S920 is "No" (the optimized eye mask 410 conflicts with the current eye pattern 400), the parameter eye_mask_pass is 0. If the eye pattern check fails (i.e., the parameter eye_mask_pass is 0), and it is the last eye pattern check (i.e., a parameter eye_rerun is 1), the control circuit 120 enters a next state S990 to perform a result return operation. The control circuit 120 may return the result of the "table sweep state machine" (the current optimal parameter index and the eye mask under the parameter index setting) to the parent state in the state S990. If the eye pattern check fails (i.e., the parameter eye_mask_pass is 0), and it is not the last eye pattern check (i.e., the parameter eye_rerun is 0), the control circuit 120 may respectively perform an index update (i.e., a state S950) operation, an amplitude check (i.e., a state S955) operation and an index average (i.e., a state S960) operation according to different settings of a parameter idx_nx and a parameter amp_chk_bypass. For example, when the parameter eye_mask_pass is 0, the parameter eye_rerun is 0, and the parameter idx_nx is less than or equal to a threshold idx_end, the control circuit 120 may enter the state S950. The threshold idx_end may be any real number determined according to the actual design. When the parameter eye_mask_pass is 0, the parameter eye_rerun is 0, the parameter idx_nx is greater than the threshold idx_end, and the parameter amp_chk_bypass is 0, the control circuit 120 may enter the state S955. When the parameter eye_mask_pass is 0, the parameter eye_rerun is 0, the parameter idx_nx is greater than the threshold idx_end, and the parameter amp_chk_bypass is 1, the control circuit 120 may enter the state S960.

If the check result of the state S920 is "Yes" (the optimized eye mask 410 does not conflict with the current eye pattern 400), the parameter eye_mask_pass is 1, and the control circuit 120 enters the state S930 to perform an eye boundary scan operation. The state S930 is used to check the inner boundary of the current eye pattern 400. The state S930 may call an eye boundary scan state machine to search for the inner boundary of the eye pattern under the current parameter index setting, and after completing the eye boundary scan state machine, a state S940 is entered to perform an eye mask & optimal index update operation. Details of the eye boundary scan state machine called by the state S930 may be obtained by referring to the related description of the embodiment shown in FIG. 12.

Figure 12:
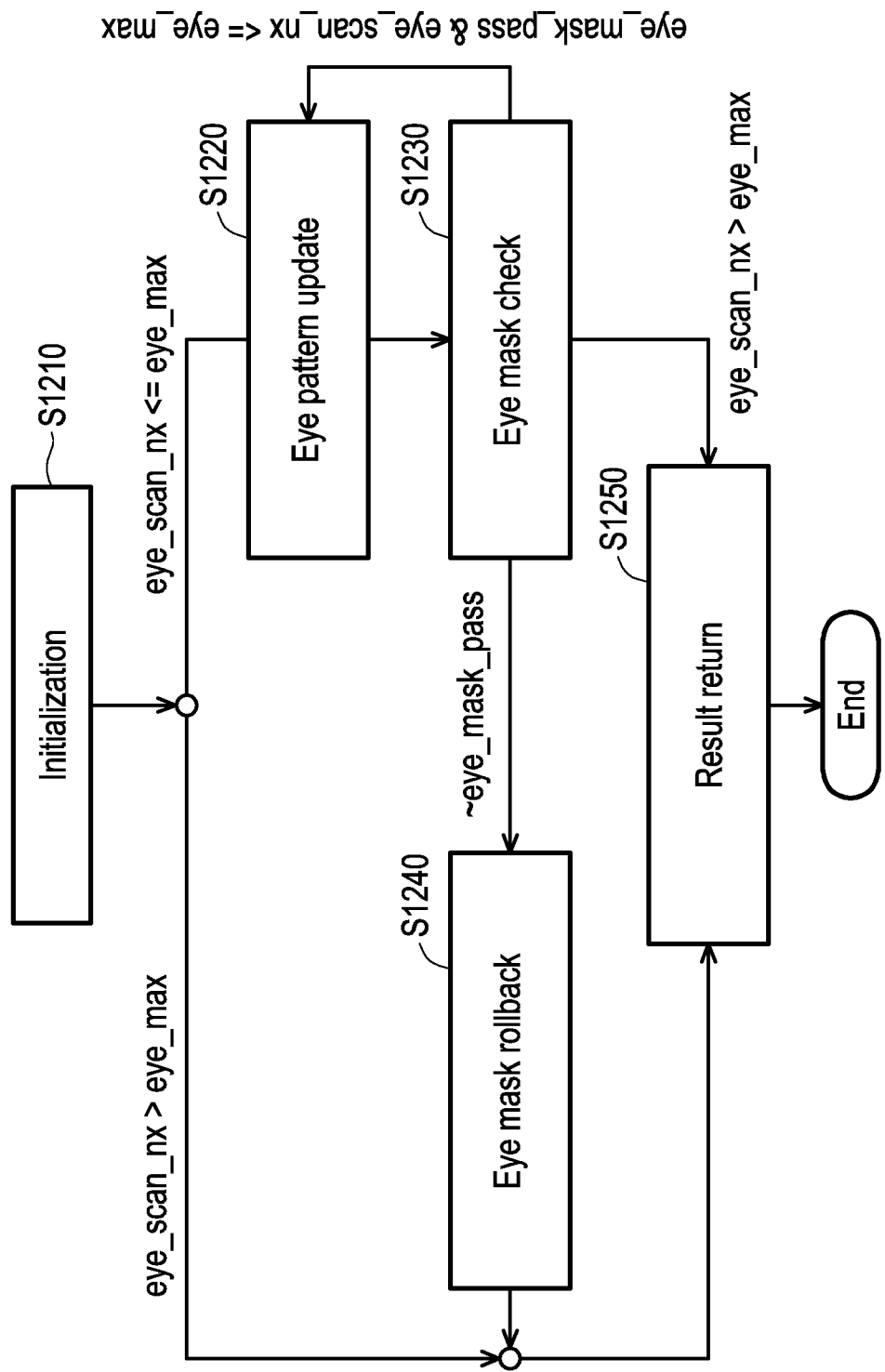
FIG. 12 is a schematic state flowchart of an eye boundary scan state machine according to an embodiment of the invention.

FIG. 12 is a schematic state flowchart of an eye boundary scan state machine according to an embodiment of the invention. An initialization operation of a state S1210 shown in FIG. 12 may be to load check points of an initial eye mask set by the parent state (for example, the vertices A, B, C, and D of the optimized eye mask 410 shown in FIG. 4), and set an eye pattern step. Referring to FIG. 4 and FIG. 12, the control circuit 120 may use the optimized eye mask 410 as the current eye mask. A parameter eye_scan_nx shown in FIG. 12 may represent an X-axis coordinate or a Y-axis coordinate of one of the vertices of the current eye mask. If the current eye mask is larger than a predetermined maximum eye mask 430 (i.e., eye_scan_nx>eye_max), the control circuit 120 enters a next state S1250 to perform a result return operation, so as to return the result of the "eye boundary scan state machine" to the parent state. The maximum eye mask 430 may be set according to the actual design. The threshold eye_max shown in FIG. 12 may represent an X-axis coordinate or a Y-axis coordinate of one of the vertices of the maximum eye mask 430. If the parameter eye_scan_nx is greater than the threshold eye_max, the control circuit 120 may determine that the current eye mask is larger than the maximum eye mask 430.

If the current eye mask is less than or equal to the predetermined maximum eye mask 430 (i.e., eye_scan_nx<=eye_max), the control circuit 120 enters a next state S1220 to perform a current eye update operation. The state S1220 is used to update the current eye mask for a next round of eye pattern check. The control circuit 120 may increase the current eye mask in the state S1220. For example, the control circuit 120 may increase the optimized eye mask 410 (the current eye mask) by one step to serve as the new eye mask 420, and then update the current eye mask to the new eye mask 420. In detail, the control circuit 120 may reduce the vertices A and D of the optimized eye mask 410 by one eye pattern step to serve as vertices A' and D' of the new eye mask 420, and increase the vertices B and C of the optimized eye mask 410 by one eye pattern step to serve as vertices B' and C' of the new eye mask 420. Therefore, the control circuit 120 may enlarge the current eye mask from the optimized eye mask 410 to the new eye mask 420 in the state S1220.

After completing the state S1220, the control circuit 120 may enter a state S1230 to perform an eye mask check operation. The state S1230 may call the eye mask check state machine shown in FIG. 10 to check whether the current eye pattern 400 under the current parameter index setting may pass the check of the current eye mask (for example, the new eye mask 420 shown in FIG. 4) updated (increased) in the state S1220. The eye mask check state machine may return a result of "eye mask check" to the parent state (the state S1230). If the result of "eye mask check" is passed, the parameter eye_mask_pass is set to 1, otherwise the parameter eye_mask_pass is set to 0. When the parameter eye_mask_pass is 1 and the current eye mask is less than or equal to the maximum eye mask 430 (eye_scan_nx<=eye_max), the control circuit 120 may enter the state S1220 again to update (increase) the current eye mask, for example, increase the new eye mask 420 shown in FIG. 4 for the next round of eye pattern check.

If the current eye mask is larger than the maximum eye mask 430 (eye_scan_nx>eye_max), the control circuit 120 may enter a next state S1250 to return the result of the "eye boundary scan state machine" to the parent state, and then end search of the maximum mask. If the parameter eye_ mask_pass is 0 (the result of "eye mask check" is not passed), the control circuit 120 may enter a next state S1240 to perform an eye mask rollback operation. Since the current eye mask fails the check of the current eye pattern 400, it is necessary to adjust the current eye mask back to the eye mask in the previous round of check (for example, to reduce the current eye mask by one step), and set the candidate parameter index back to the parameter index of the previous round of check. After completing the state S1240, the control circuit 120 may enter the state S1250 to return the results of the "eye boundary scan state machine" to the parent state. The result of the "eye boundary scan state machine" includes an optimized candidate eye mask, and the optimized candidate eye mask is the "current eye mask" closest to the inner boundary of the current eye pattern 400.

Referring to FIG. 9, after completing the state S930, the control circuit 120 may enter the state S940 to perform eye mask and optimization index update operations. The state S940 may use the candidate parameter index currently passing the eye pattern check as the optimized index, and at the same time update the optimized eye mask to the optimized candidate eye mask obtained in the state S930. If the previous eye pattern check is the last eye pattern check (i.e., the parameter eye_rerun is 1), the control circuit 120 enters a next state S990 to perform a result return operation. The control circuit 120 may return a result of the "table sweep state machine" (the current optimal parameter index and the eye mask under the parameter index setting) to the parent state in the state S990.

After the state S940 is completed, in case that the parameter eye_rerun is 0, if the next eye mask is larger than the maximum eye mask 430 (i.e., the parameter eye_nx>eye_max) or all parameter indexes have been swept (i.e., idx_nx>idx_end), the control circuit 120 may choose to perform an amplitude check operation (the state S955) or an index average (the state S960) operation according to the setting of the parameter amp_chek_bypass. For example, when the parameter amp_chek_bypass is 0, the control circuit 120 may enter the state S955. When the parameter amp_chek_bypass is 1, the control circuit 120 may enter the state S960. After the state S940 is completed, in case that the parameter eye_rerun is 0, if the next eye mask is less than or equal to the maximum eye mask 430 (i.e., eye_nx<=eye_max) and not all indexes have been swept (i.e., idx_nx<=idx_end), the control circuit 120 may then enter the state S950 to perform the index update operation. In the state S950, the current parameter index may be updated to a new parameter index (idx_nx) in order to use a control parameter corresponding to the next parameter index idx_nx to perform the eye pattern check. After completing the parameter index update, the control circuit 120 may return to the state S920 (the eye mask check).

Figure 13:
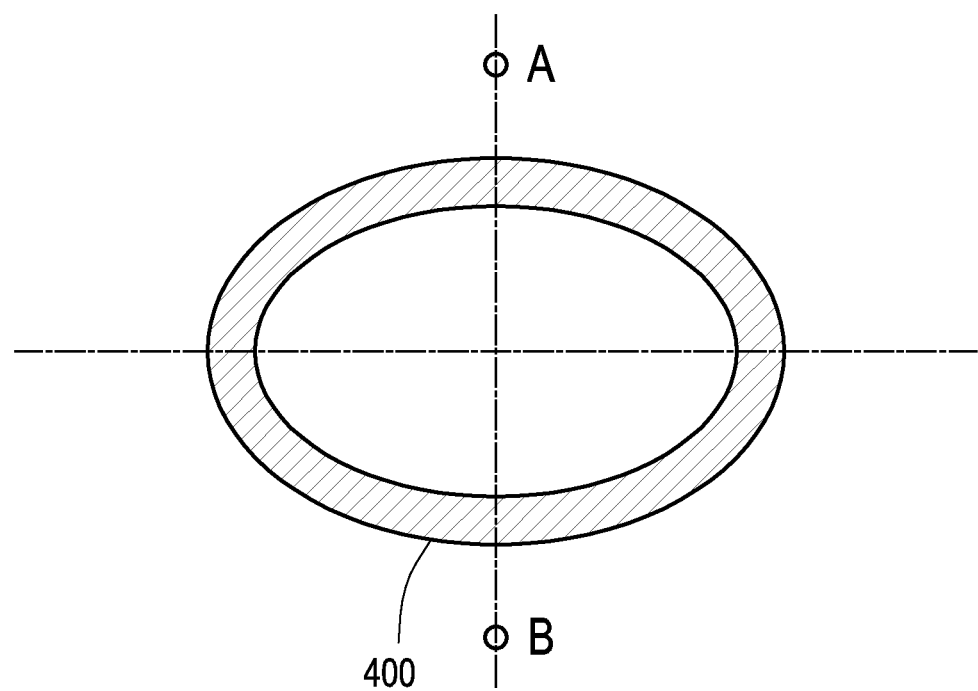
FIG. 13 is a schematic diagram illustrating amplitude and a threshold of a current eye pattern according to an embodiment of the invention.

The state S955 (the amplitude check) may call an amplitude check state machine to check whether a height/amplitude of the current eye pattern 400 under the current index setting exceeds a predetermined setting value. FIG. 13 is a schematic diagram illustrating amplitude and a threshold of the current eye pattern 400 according to an embodiment of the invention. The amplitude check state machine may be used to check whether an outer boundary of the current eye pattern 400 is within a threshold (an amplitude point A and an amplitude point B in FIG. 13) under the setting of the current control parameter SC. The amplitude points A and B shown in FIG. 13 are set at a middle position in a horizontal direction of the eye pattern. The positions of the amplitude points A and B may be set according to the actual design. If an outer boundary of an upper half of the current eye pattern 400 is below the amplitude point A and an outer boundary of a lower half of the current eye pattern 400 is above the amplitude point B, the control circuit 120 may consider that the current eye pattern 400 under the setting of the current control parameter SC is valid, so that a parameter valid is set to 1. If a height of the current eye pattern 400 exceeds the threshold (the amplitude point A and the amplitude point B in FIG. 13), the parameter valid is 0. Therefore, the control circuit 120 may check whether the amplitude of the current eye pattern 400 exceeds the threshold (the amplitude point A and the amplitude point B in FIG. 13). When the magnitude of the current eye pattern 400 exceeds the threshold, the optimized eye mask 410 and the optimized control parameter corresponding to the optimized eye mask 410 are maintained (unchanged). For details of the amplitude check state machine called by the state S955, reference may be made to the relevant description of the embodiment shown in FIG. 14.

Figure 14:
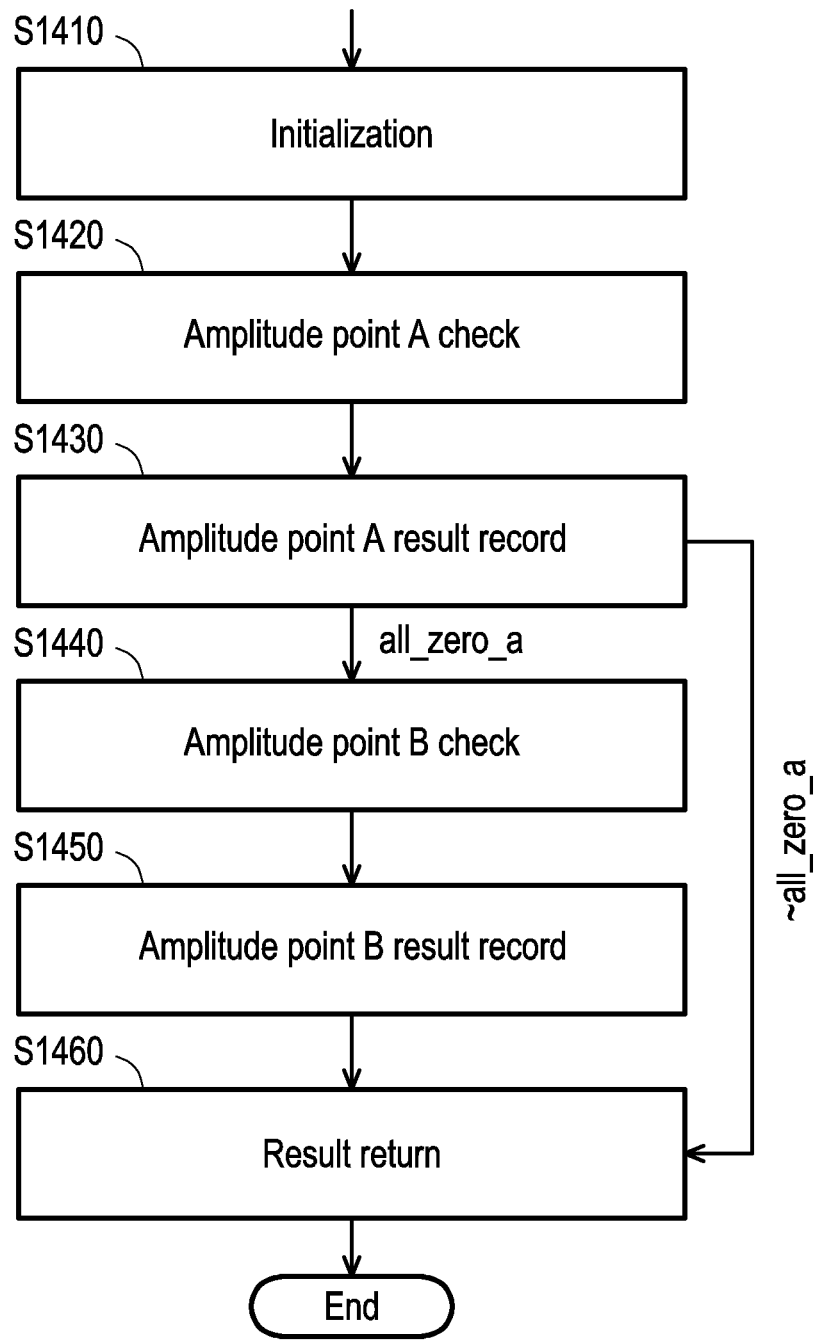
FIG. 14 is a schematic state flowchart of an amplitude check state machine according to an embodiment of the invention.

FIG. 14 is a schematic state flowchart of an amplitude check state machine according to an embodiment of the invention. An initialization operation in a state S1410 shown in FIG. 14 may be to load predetermined amplitude points, such as the amplitude point A and the amplitude point B shown in FIG. 13. Referring to FIG. 13 and FIG. 14, the control circuit 120 may call an amplitude point check state machine in a state S1420 to perform a check operation on the amplitude point A. The state S1420 may check whether an outer side of the current eye pattern 400 under the setting of the current control parameter SC is smaller than the amplitude point A. If the outer side of the current eye pattern 400 is smaller than the amplitude point A, a parameter all_zero_a is 1, otherwise, the parameter all_zero_a is 0. For details of the amplitude check state machine, reference may be made to the related description of the embodiment shown in FIG. 15.

Figure 15:
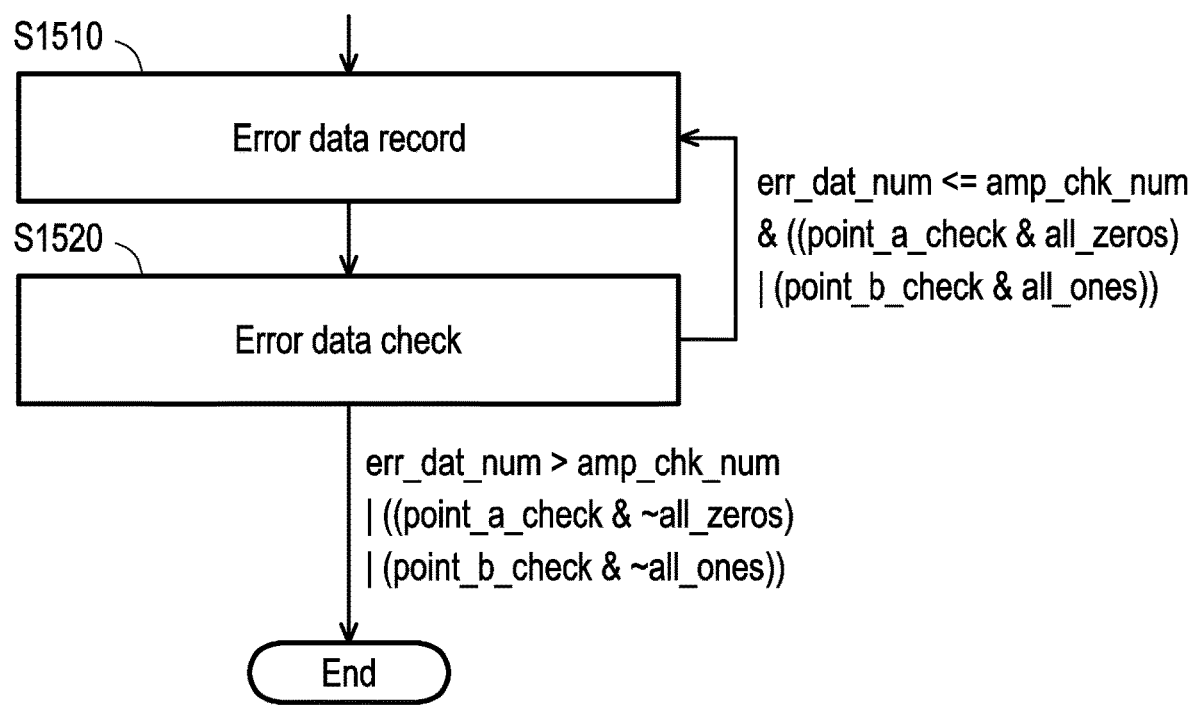
FIG. 15 is a schematic state flowchart of an amplitude check state machine according to an embodiment of the invention.

FIG. 15 is a schematic state flowchart of an amplitude check state machine according to an embodiment of the invention. An error data record operation of a state S1510 shown in FIG. 15 may record the current parallel data error[k:0], and accumulate a number of the parallel data error[k:0] that have been recorded. After completing the state S1510, the control circuit 120 may enter a state S1520 to perform an error data check operation. The state S1520 may check whether each bit of the recorded parallel data error[k:0] is all 0 (or all 1). In case of all 0, a parameter all_zeros is set to 1. In case of all 1, a parameter all_ones is set to 1. When an accumulated amount of the checked parallel data error[k:0] is less than or equal to a predetermined value (i.e., an accumulated amount err_dat_num is less than or equal to a threshold amp_chk_num), and it is currently in the state S1420 where the amplitude check state machine shown in FIG. 15 is used to check the amplitude point A shown in FIG. 13, and the parallel data error[k:0] is all 0 (i.e., point_a_check & all_zeros are logic true), the control circuit 120 returns to the state S1510 to perform the error data record operation. Alternatively, if it is currently in a state S1440 where the amplitude check state machine shown in FIG. 15 is used to check the amplitude point B shown in FIG. 13, and the parallel data error[k:0] is all 1 (i.e., point_b_check & all_ones are logic true), and when the accumulated amount of the checked parallel data error[k:0] is less than or equal to the predetermined value (i.e., err_dat_num<=amp_chk_num), the control circuit 120 returns to the state S1510 to perform the error data record operation. When the parallel data error[k:0] is not all 0 in case of point A check (i.e., point_a_check &-all_zeros are logic true), or when the parallel data error[k:0] data is not all 1 in case of point B check (i.e., point_b_check &-all_ones are logic true), or when a data accumulated amount of the checked parallel data error[k:0] is greater than a predetermined setting value (i.e., err_dat_num>amp_chk_num), the control circuit 120 ends the amplitude check state machine and returns to the parent state.

Referring to FIG. 14, after completing the state S1420, the control circuit 120 enters a state S1430 to perform a result record operation of the amplitude point A. The state S1430 may record a value of the current parameter all_zero_a. If the parameter all_zero_a is 0, the control circuit 120 enters a next state S1460 to perform a result return operation, so as to return the result of the "amplitude check state machine" to the parent state. If the parameter all_zero_a is 1, the control circuit 120 enters the next state S1440. The control circuit 120 may call the amplitude check state machine shown in FIG. 15 in the state S1440 to perform a check operation on the amplitude point B. For details of the amplitude check state machine, reference may be made to the related description of the embodiment shown in FIG. 15. The state S1440 may check whether the outer side of the current eye pattern 400 under the setting of the current control parameter SC is greater than the amplitude point B. If the outer side of the current eye pattern 400 is larger than the amplitude point B, the parameter all_ones_b is 1; otherwise, the parameter all_ones_b is 0. The state S1450 may record the value of the current parameter all_ones_b. The state S1460 may return an amplitude check result of the "amplitude check state machine" to the parent state. If the amplitude check is passed, the parameter valid returned by the amplitude check state machine to the parent state is 1 (or otherwise 0). A relationship between the parameter valid, the parameter all_zeros_a and the parameter all_ones_b is valid=all_zeros_a & all_ones_b.

Referring to FIG. 9, if the parameter valid of the state S955 is 0 and not all indexes have been swept (i.e., idx_nx<=idx_end), the control circuit 120 enters the next state S950 to perform the index update operation. If the parameter valid is 0 and all indexes have been swept (i.e., idx_nx>idx_end), the control circuit 120 enters a next state S970 to update a table sweep count.

If the parameter valid of the state S955 is 1, the control circuit 120 enters the next state S960 to perform the index average operation. In the state S960, the optimal index obtained in the state S940 of the current iteration and the optimal indexes obtained in other iterations are put together and averaged to serve as a final optimization result. The state S970 records the number of times that the entire "table sweep" process is repeated to generate a counting value iter_cnt. If the counting value iter_cnt is less than the predetermined number of iterations iter_num (i.e., iter_cnt<iter_num), the control circuit 120 returns to the state S910, and the entire process shown in FIG. 9 will be repeated until the predetermined number of iterations is completed. If the counting value iter_cnt is greater than the predetermined number of iterations (i.e., iter_cnt>=iter_num), the control circuit 120 enters a next state S980 to perform an eye rerun request operation. In the state S980, a parameter eye_rerun is set to 1, and then the control circuit 120 returns to the state S910. The state S980 is used to initiate a request for evaluating an eye pattern size under the parameter index setting after the optimal parameter index is obtained.

Referring to FIG. 7, the fine optimization operation of the state S730 may include: calling the table sweep state machine shown in FIG. 9 to perform the iterative operation on a target table in a plurality of control parameter tables (for example, the aforementioned table 2, table 3 and/or table 4), to determine an optimized index after sweeping a plurality of indexes in the index field of the target table; and regarding other tables in the plurality of control parameter tables except the target table, obtaining a plurality of control parameters from the other tables to a plurality of functional circuits of the receiving circuit according to the plurality of parameter indexes corresponding to the optimized hint index in the hint table. The iterative operation further includes: selecting a selected index from a plurality of indexes of the index field of the target table according to the starting index, the ending index and the index step, where a plurality of control parameters of the parameter field in the target table are applicable to one of the plurality of functional circuits; and using a control parameter in the parameter field indicated by the selected index as a parameter of the candidate control parameters.

For example, the table sweep state machine may sweep each of the control parameter tables in sequence according to the set starting index, the ending index, and the index step, such as the VGA table shown in table 2, the CTLE table shown in table 3, and/or the DFE table shown in table 4. When sweeping the current control parameter table, the value of the other control parameter tables that have not yet swept is a parameter value corresponding to the optimal parameter index obtained in the hint table (for example, table 1). For example, when sweeping the VGA table shown in table 2, the parameter values of the CTLE table shown in table 3 and the DFE table shown in table 4 are the parameter values corresponding to the optimal parameter indexes Index_ctle and Index_dfe of the hint table shown in table 1 obtained in the hint optimization of the state S710. When sweeping each parameter, the control circuit 120 may select the optimal control parameters according to the size of the eye mask to set the CTLE 112, the VGA 113 and the DFE 114.

Figure 16:
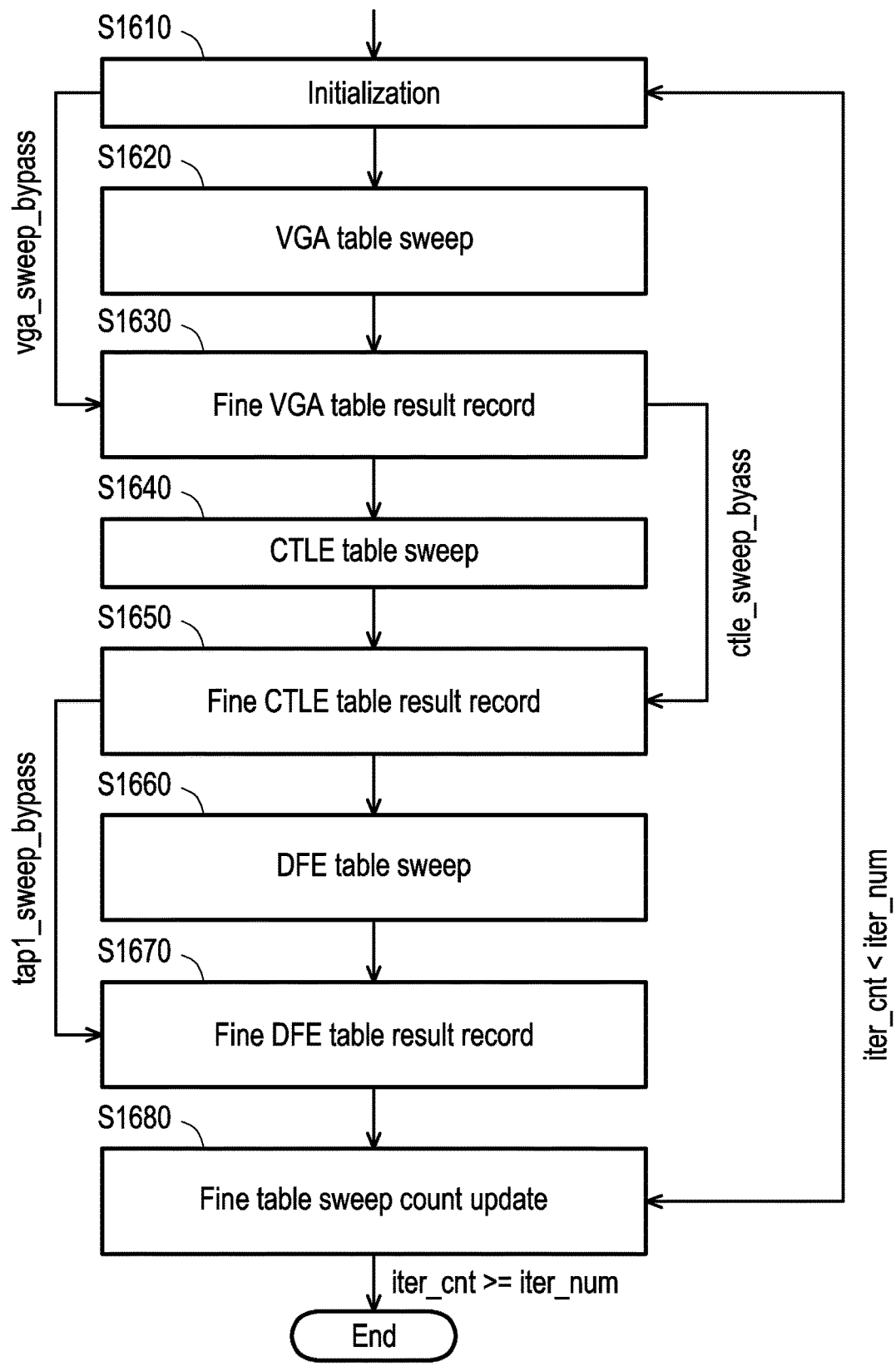
FIG. 16 is a schematic state flowchart of fine optimization of FIG. 7 according to an embodiment of the invention.

FIG. 16 is a schematic state flowchart of the fine optimization (the state S730) of FIG. 7 according to an embodiment of the invention. For the state S730 shown in FIG. 7, reference may be made to the related description of FIG. 16. Referring to FIG. 6 and FIG. 16, to make the description simple and clear, the embodiment of FIG. 16 only shows the table sweep operations performed on the VGA table shown in table 2, the CTLE table shown in table 3, and the DFE table shown in table 4. In a practical application, the embodiment of FIG. 16 may include more other circuit parameters that may affect a performance of the receiving circuit 110.

The initialization operation of a state S1610 shown in FIG. 16 may be to set/load the starting index, the ending index and the index step related to the parameter indexes of the VGA table, the CTLE table and the DFE table in the fine optimization. Namely, the initialization operation may set the starting index, the ending index and the index step of the parameter index field Index_vga shown in table 2, and set the starting index, the ending index and the index step of the parameter index field Index_ctle shown in table 3, and set the starting index, the ending index and the index step of the parameter index field Index_dfe shown in table 4. The initialization operation may also set the initial eye mask for subsequent eye pattern comparison operations.

The VGA table sweep operation in a state S1620 may call the table sweep state machine (referring to the description of FIG. 9 for details) to sweep the VGA table shown in table 2, so as to perform the iterative operation on the VGA table shown in table 2. For example, the control circuit 120 may select one (which is referred to as a selected index hereinafter) from a plurality of parameter indexes (for example, 0-15, but the invention is not limited thereto) of the parameter index field Index_vga of the VGA table shown in table 2 according to the starting index, the ending index and the index step of the VGA table 2. After the state S1620 is completed, the control circuit 120 may enter a state S1630 to generate a fine VGA table result record for the use of subsequent states. After the state S1630 is completed, the control circuit 120 may enter a state S1640 to call the table sweep state machine (refer to the description of FIG. 9 for details) to sweep the CTLE table shown in table 3, and then perform the iterative operation on the CTLE table shown in table 3. In the step S1640, the control circuit 120 may use the result (the optimal control parameter of the VGA table) recorded in the state S1630 to control the VGA 113, and the result (the parameter index Index_dfe indicated by the optimal hint index of the hint table) recorded in the state S720 to control the DFE 114. After the state S1640 is completed, control circuit 120 may enter a state S1650 to generate a fine CTLE table result record for the use of subsequent states.

After the state S1650 is completed, the control circuit 120 may enter a state S1660 to call the table sweep state machine (refer to the description of FIG. 9 for details) to sweep the DFE table shown in table 4, and then perform the iterative operation on the DFE table shown in table 4. In the state S1660, the control circuit 120 may use the result (the optimal control parameter of the VGA table) recorded in the state S1630 to control the VGA 113 and use the result (the optimal control parameter of the CTLE table) recorded in the state S1650 to control the CTLE 112. After the state S1660 is completed, the control circuit 120 may enter a state S1670 to generate a fine DFE table result record for the use of subsequent states. After the state S1670 is completed, the control circuit 120 enters a next state S1680 to update a fine table sweep count iter_cnt. The state S1680 records the number of times (iter_cnt) that the entire fine optimization process is performed, and compares it with a predetermined number of iterations iter_num. If the fine table sweep count iter_cnt is less than the number of iterations iter_num (i.e., iter_cnt<iter_num), the control circuit 120 returns to the state S1610 again. If the fine table sweep count iter_cnt is greater than or equal to the number of iterations iter_num until a predetermined number of iterations is completed (i.e., iter_cnt>=iter_num), the control circuit 120 ends the fine optimization operation shown in FIG. 16 and returns to the parent state. Finally, the optimal index of each parameter may be an average of the optimal indexes of each of the parameters obtained in each iteration. For example, the final optimal index of the VGA parameter is an average of the optimal VGA parameter indexes obtained in each iteration.

In some embodiments, the initial index used in the VGA table sweep, the CTLE table sweep, and the DFE table sweep in a first iteration is the result (the parameter index indicated by the optimal hint index of the hint table shown in table 1) recorded in the state S720. However, in the subsequent iterations, the initial index of each parameter in the current iteration is the optimal index of each parameter recorded in the previous iteration. For example, in a second iteration, the initial indexes used by the VGA table sweep, the CTLE table sweep, and the DFE table sweep are respectively the optimal parameter indexes recorded in the states S1630, S1650 and S1670 in the first iteration.

The initial eye masks used for the VGA table sweep, the CTLE table sweep, and the DFE table sweep are all the optimized eye masks recorded in the previous states. For example, in the first iteration, the initial eye mask used in the VGA table sweep (the state S1620) is the optimized eye mask recorded by the state S720, the initial eye mask used in the CTLE table sweep (the state S1640) is the optimized eye mask recorded by the state S1630, and the initial eye mask used in the DFE table sweep (the state S1660) is the optimized eye mask recorded by the state S1650. In the second iteration, the initial eye mask used in the VGA table sweep (the state S1620) is the eye pattern recorded by the state S1670 in the first iteration.

In some application situations, some states may be bypassed according to different settings. For example, when a parameter vga_sweep_bypass is 1, the control circuit 120 will not perform optimization of the control parameter vga[m:0] (bypassing the state S1620). When a parameter ctle_sweep_byass is 1, the control circuit 120 will not perform optimization of the control parameter ctle[1:0] (bypassing the state S1640). When a parameter tap1_sweep_bypass is 1, the optimization of the control parameter tap1[n:0] is not performed (bypassing the state S1660). When a certain state is bypassed, the parameter index recorded in the recording state after the state is the optimal index of the corresponding parameter recorded in the state S720, and the recorded eye mask is the optimized eye pattern recorded in the previous recording state. For example, in the first fine optimization, when the state S1620 is bypassed, the index recorded in the state S1630 is the parameter index Index_vga recorded in the state S720, and the eye mask recorded in the state S1630 is the optimized eye mask recorded in the state S720. When the state S1640 is bypassed, the index recorded in the state S1650 is the parameter index Index_ctle recorded in the state S720, and the eye mask recorded in the state S1650 is the optimized eye mask recorded in the state S1630.

Referring to FIG. 7, the perturbation optimization operation in the state S750 may include: calling a perturbation optimization state machine to perform a first-direction perturbation check on any target table of the plurality of control parameter tables, starting from an optimized index, to decide whether to update the optimized index; and calling the perturbation optimization state machine to perform a second-direction perturbation check on any target table starting from the optimized index to decide whether to update the optimized index. For example, the state S750 (perturbation optimization) may call a perturbation optimization state machine to use the set of optimal parameter indexes obtained in the state S740 (fine optimization) as the initial index, to perform perturbation (to add or subtract a step based on the optimal index) in positive and negative directions of the optimal parameter index in each of the control parameter tables. According to the actual design, the control parameter table includes, for example, the VGA table shown in table 2, the CTLE table shown in table 3, and/or the DFE table shown in table 4. If the perturbed new index may make the eye pattern larger, the new index is used; otherwise, the new index is discarded.

Figure 17:
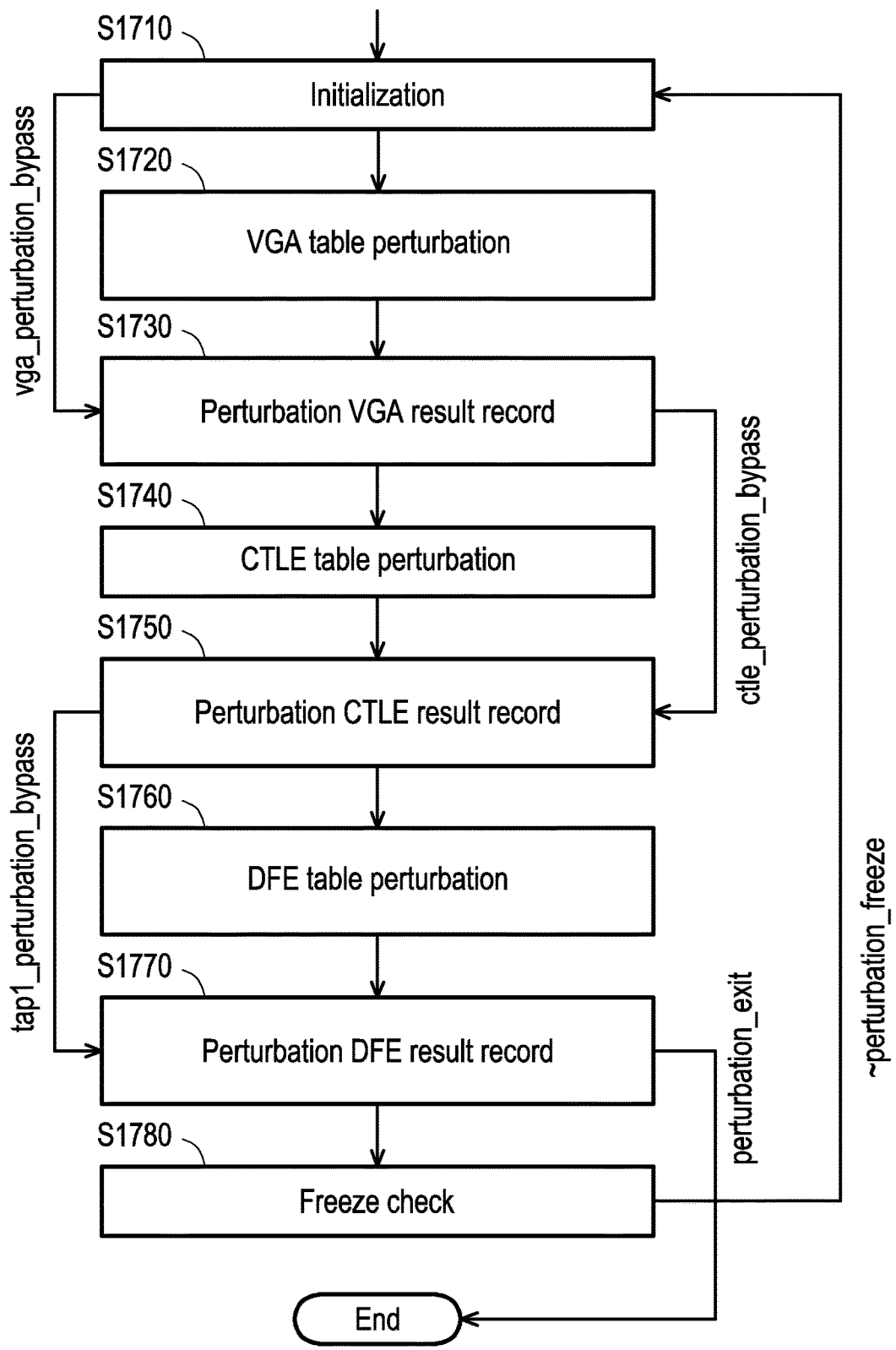
FIG. 17 is a schematic state flowchart of perturbation optimization of FIG. 7 according to an embodiment of the invention.

FIG. 17 is a schematic state flowchart of the perturbation optimization (the state S750) of FIG. 7 according to an embodiment of the invention. For the state S750 shown in FIG. 7, reference may be made to the related description of FIG. 17. FIG. 17 shows a state flowchart of a perturbation optimization state machine. Referring to FIG. 6 and FIG. 17, to make the description simple and clear, the embodiment shown in FIG. 17 only lists the table sweep operations performed on the VGA table shown in table 2, the CTLE table shown in table 3, and the DFE table shown in table 4. In a practical application, the embodiment shown in FIG. 17 may include more other circuit parameters that may affect the performance of the receiving circuit 110.

The initialization operation of a state S1710 shown in FIG. 17 may be to set/load the starting index, the ending index and the index step related to the parameter indexes of the VGA table, the CTLE table and the DFE table in the perturbation optimization. Namely, the initialization operation may set the starting index, the ending index and the index step of the parameter index field Index_vga shown in table 2, and set the starting index, the ending index and the index step of the parameter index field Index_ctle shown in table 3, and set the starting index, the ending index and the index step of the parameter index field Index_dfe shown in table 4. The initialization operation may also set the initial eye mask for subsequent eye pattern comparison operations.

The VGA perturbation operation of the state S1720, the CTLE perturbation operation of the state S1740, and the DFE perturbation operation of the state S1760 may call a table perturbation state machine to respectively and sequentially perturb the parameter indexes Index_vga, Index_ctle and Index_dfe in table 2, table 3 and table 4 and check a size of the current eye pattern 400 under the current index setting to determine whether to adopt the new parameter index. If the new parameter index makes the current eye pattern 400 larger, the new index is adopted; otherwise, the new index is discarded. For details of the table perturbation state machine, reference may be made to the related description of an embodiment of FIG. 18.

Figure 18:
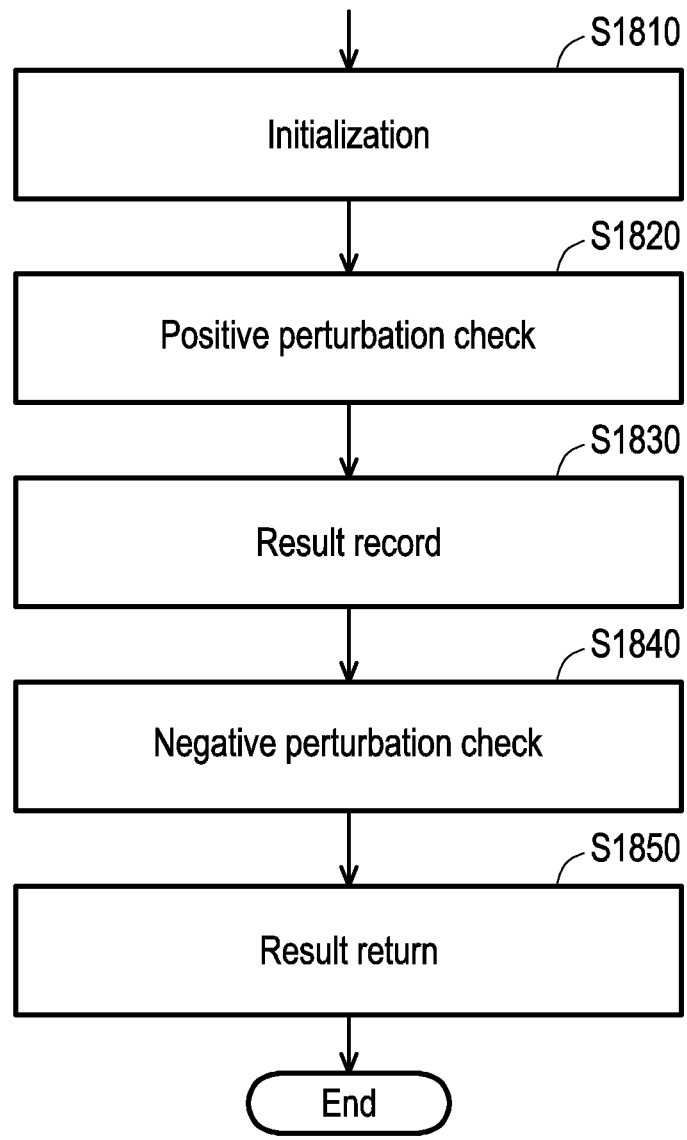
FIG. 18 is a schematic state flowchart of a table perturbation state machine according to an embodiment of the invention.

FIG. 18 is a schematic state flowchart of a table perturbation state machine according to an embodiment of the invention. According to the state (the parent state) of calling the table perturbation state machine, an initialization operation of a state S1810 shown in FIG. 18 may be to set/load the starting index, the ending index, the index step and the initial eye mask related to the corresponding control parameters. For example, when the state S1720 (VGA table perturbation) calls the table perturbation state machine shown in FIG. 18, the table perturbation state machine may load the initial index, the index step, the index final value and the initial eye mask of the VGA table set in the perturbation optimization state machine. When the state S1740 (CTLE table perturbation) calls the table perturbation state machine shown in FIG. 18, the table perturbation state machine loads the initial index, the index step, the index final value and the initial eye mask of the CTLE table set in the perturbation optimization state machine. After completing the initialization operation of the state S1810, the control circuit 120 may enter a state S1820 to perform a positive perturbation check operation.

In the state S1820, the table perturbation state machine may call the perturbation check state machine to add a step to the current index value and check a size of the eye pattern. If the eye pattern does not become larger, the state S1820 is ended to enter a state S1830 to generate a result record. Conversely, the current index value is continuously increased by one step to check the size of the eye pattern until the new index does not make the eye pattern larger. For details of the perturbation check state machine, reference may be made to the related description of an embodiment of FIG. 19.

Figure 19:
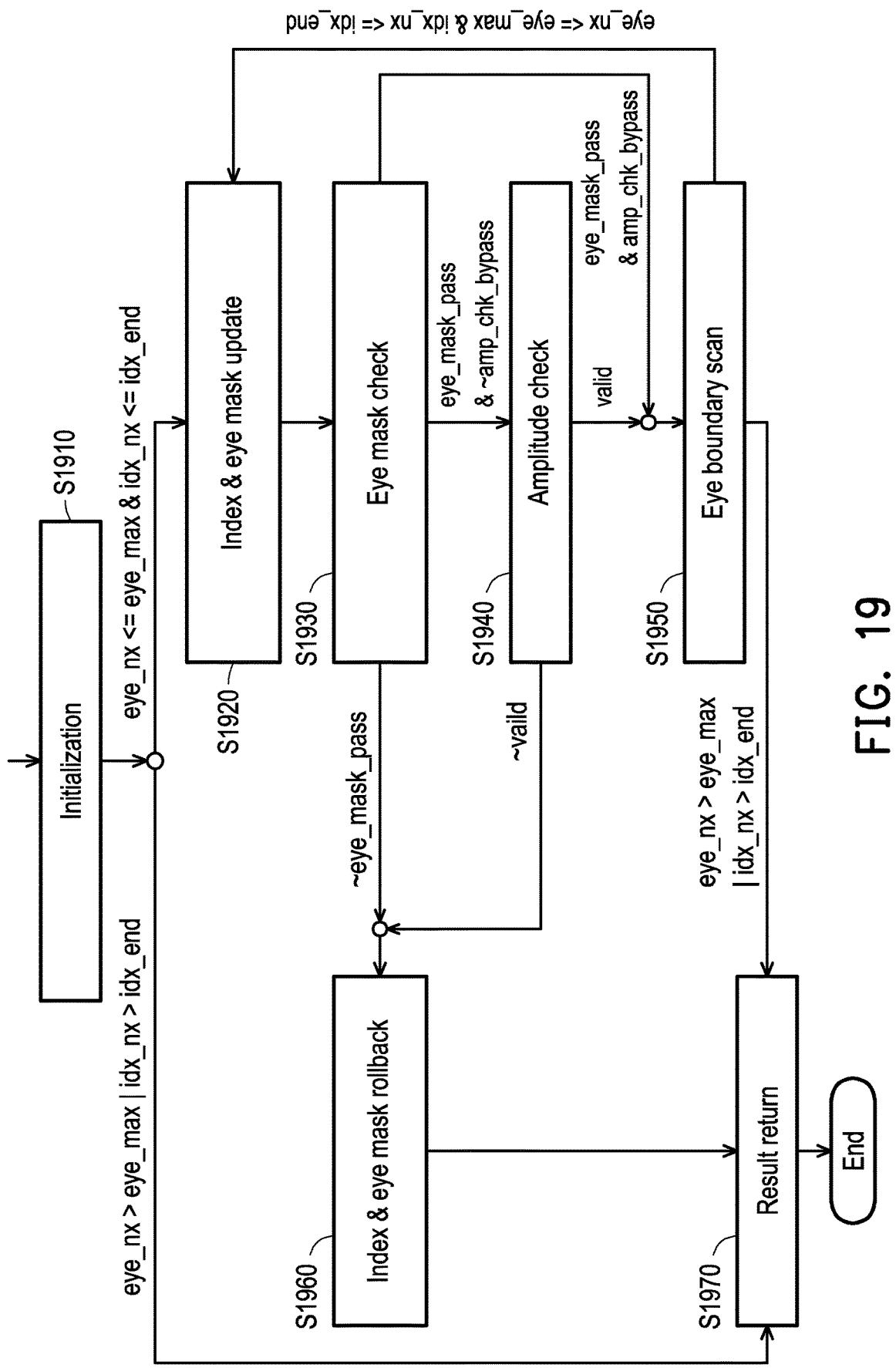
FIG. 19 is a schematic state flowchart of a perturbation check state machine according to an embodiment of the invention.

FIG. 19 is a schematic state flowchart of a perturbation check state machine according to an embodiment of the invention. According to the state (the parent state) of calling the perturbation check state machine, an initialization operation of a state S1910 shown in FIG. 19 may be to set/load a target control parameter table, the initial index, the index step, the index final value and the initial eye mask set in the table perturbation state machine. The parameter eye_nx shown in FIG. 19 may represent an X-axis coordinate or a Y-axis coordinate of one of the vertices of the current eye mask. The threshold eye_max shown in FIG. 12 may represent an X-axis coordinate or a Y-axis coordinate of one of the vertices of the maximum eye mask 430. The maximum eye mask 430 may be set according to the actual design. If the current eye mask is larger than the predetermined maximum eye mask 430 (i.e., eye_nx>eye_max) or all parameter indexes of the target control parameter table have been swept (i.e., idx_nx>idx_end), the control circuit 120 enters a next state S1970 to perform a result return operation to return the result of the "perturbation check state machine" to the parent state. If the current eye mask is less than or equal to the predetermined maximum eye mask 430 (i.e., eye_nx<=eye_max) and not all parameter indexes of the target control parameter table have been swept (i.e., idx_nx<=idx_end), the control circuit 120 enters a next state S1920 to perform an index & eye mask update operation.

The state S1920 is used to update the current parameter index and the current eye mask. After the state S1920 is completed, a state S1930 is entered to perform an eye mask check operation. The state S1930 may call the eye mask check state machine shown in FIG. 10 to check whether the current eye pattern 400 under the current parameter index setting may pass the check of the current eye mask (for example, the optimized eye mask 410). If the check result of the state S1930 is failed (i.e., the parameter eye_mask_pass is 0), the control circuit 120 enters a next state S1960 to perform an index & eye mask rollback operation. Since the current eye mask fails the check of the current eye pattern 400, it is necessary to adjust the current eye mask back to the eye mask in the previous round of check (for example, to reduce the current eye mask by one step), and set the candidate parameter index back to the parameter index in the previous round of check. After completing the state S1960, the control circuit 120 may enter a state S1970 to return the result of the "perturbation check state machine" to the parent state.

If the check result of the state S1930 is passed (i.e., the parameter eye_mask_pass is 1) and the parameter amp_chk_bypass is 1, the control circuit 120 bypasses a state S1940 and enters a state S1950. If the check result of the state S1930 is passed (i.e., the parameter eye_mask_pass is 1) and the parameter amp_chk_bypass is 0, the control circuit 120 enters the next state S1940 to perform an amplitude check operation. The state S1940 may call the amplitude check state machine shown in FIG. 14 to check whether a height/amplitude of the current eye pattern 400 under the current parameter index setting exceeds a predetermined value. If yes, the parameter valid is 0; otherwise, the parameter valid is 1. If the parameter valid of the state S1940 is 0, the control circuit 120 enters the next state S1960 to perform the index & eye mask rollback operation. If the parameter valid of the state S1940 is 1, the control circuit 120 enters the next state S1950 to perform an eye boundary scan operation.

The state S1950 may call an eye boundary scan state machine shown in FIG. 12 to search for an eye pattern inner boundary under the current parameter index setting. If the current eye mask is less than or equal to the predetermined maximum eye mask 430 (i.e., eye_nx<=eye_max) and not all parameter indexes of the target control parameter table have been swept (i.e., idx_nx<=idx_end), the control circuit 120 returns to the state S1920 to perform the index & eye mask update operation. If the current eye mask is larger than the predetermined maximum eye mask 430 (i.e., eye_nx>eye_max) or all parameter indexes of the target control parameter table have been swept (i.e., idx_nx>idx_end), the control circuit 120 enters the next state S1970 to return the result of the "perturbation check state machine" (for example, the current optimal parameter index and the current eye mask) to the parent state.

Referring to FIG. 18, after completing the state S1820, the control circuit 120 may enter the state S1830 to perform the result record operation. The state S1830 records a final optimized index and the corresponding eye mask in the state S1820 (positive perturbation check) to serve as an initial value index and an initial eye mask of a state S1840. After completing the state S1830, the control circuit 120 enters the next state S1840 to perform a negative perturbation check operation. The state S1840 may call the perturbation check state machine shown in FIG. 19 to reduce a step from the current parameter index value, and check a size of the current eye pattern. If the current eye pattern does not become larger, the state S1840 is ended, and the state S1850 is entered to return the result of the "table perturbation state machine" (such as the current optimal parameter index and the current eye mask) to the parent state. Otherwise, one step is continuously reduced and the size of the eye pattern is checked until the new index does not make the eye pattern larger.

Referring to FIG. 17, after completing the state S1720, the control circuit 120 may enter a state S1730 to perform a perturbation VGA result record operation. In the state S1730, an optimal VGA parameter index and a corresponding eye mask are recorded for the use of subsequent states. After completing the state S1730, the control circuit 120 may enter the state S1740 to call the table perturbation state machine shown in FIG. 18 to perform CTLE table perturbation. After completing the state S1740, the control circuit 120 may enter a state S1750 to perform a perturbation CTLE result record operation. In the state S1750, an optimal CTLE parameter index and a corresponding eye mask are recorded for the use of subsequent states. After completing the state S1750, the control circuit 120 may enter a state S1760 to call the table perturbation state machine shown in FIG. 18 to perform DFE table perturbation. After completing the state S1760, the control circuit 120 may enter a state S1770 to perform a perturbation DFE result record operation. In the state S1770, an optimal DFE parameter index and a corresponding eye mask are recorded for the use of subsequent states.

After completing the state S1770, the control circuit 120 may decide to enter a state S1780 or end the perturbation optimization process according to a parameter perturbation exit. If the parameter perturbation exit is 1, the perturbation optimization process shown in FIG. 17 is ended, and the current optimized parameter index will be used as the final optimized parameter index. If the parameter perturbation exit is 0, the control circuit 120 may enter the state S1780 to perform a freeze check operation. The state S1780 may check whether an upper-layer logic needs to freeze (suspend) the perturbation optimization operation to maintain the current optimization result. If a parameter perturbation freeze is 1, the perturbation optimization operation is suspended (the next round of iteration is not performed). If the parameter perturbation freeze is 0, the control circuit 120 may return to the state S1710 to continue the next round of iteration.

Based on different configurations, any one of the state S1720 (VGA perturbation), the state S1740 (CTLE perturbation), and the state S1760 (DFE perturbation) may be bypassed. For example, when a parameter vga_perturbation_ bypass in FIG. 17 is 1, the VGA perturbation (the state S1720) will not be performed. Similarly, when a parameter ctle_perturbation_bypass in FIG. 17 is 1, the CTLE perturbation (the state S1740) will not be performed. When a parameter tap1_perturbation_bypass in FIG. 17 is 1, the DFE perturbation (the state S1760) will not be performed.

It should be noted that in the first perturbation optimization iteration, the initial indexes used in the state S1720 (VGA perturbation), the state S1740 (CTLE perturbation) and the state S1760 (DFE perturbation) are the optimal parameter index values recorded in the state S740 (fine result record) shown in FIG. 7, i.e., the optimal VGA parameter index value, the optimal CTLE parameter index value and the optimal DFE parameter index value recorded by the fine VGA table result record (the state S1630), the fine CTLE table result record (the state S1650) and the fine DFE table result record (the state S1670) in the last iteration of the state S730 (fine optimization). However, in the subsequent iterations, the initial index of each parameter in the current iteration is the optimal index of each parameter recorded in the previous iteration. For example, in the second perturbation optimization iteration, the initial indexes used by the state S1720 (VGA perturbation), the state S1740 (CTLE perturbation), and the state S1760 (DFE perturbation) are respectively the optimal VGA parameter index value, the optimal CTLE parameter index value and the optimal DFE parameter index value recorded by the perturbation VGA result record (the state S1730), the perturbation CTLE result record (the state S1750) and the perturbation DFE result record (the state S1770) in the first perturbation optimization iteration.

The initial eye masks used by the state S1720 (VGA perturbation), the state S1740 (CTLE perturbation), and the state S1760 (DFE perturbation) are all the eye mask recorded in the previous recording state. For example, in the first perturbation optimization iteration, the state S1720 (VGA perturbation) uses the optimized eye mask recorded in the state S740 (fine result record) shown in FIG. 7, i.e., the optimized eye mask recorded by the fine DFE table result record (the state S1670) in the last iteration of the state S730 (fine optimization), and the state S1740 (CTLE perturbation) uses the optimized eye mask recorded in the previous state S1730 (perturbation VGA result record). Deduced by analogy, the state S1720 (VGA perturbation) in the second perturbation optimization iteration uses the optimized eye mask recorded in the state S1770 (perturbation DFE result record) in the first perturbation optimization iteration.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. An eye pattern-based control parameter adjustment method, comprising:
    performing an iterative operation by a control circuit to determine an optimized control parameter;
    updating a current control parameter of a receiving circuit to the optimized control parameter after completing the iterative operation; and
    performing hint optimization,
    wherein the hint optimization comprises:
        calling a table sweep state machine to perform the iterative operation on a hint table to determine an optimized hint index after sweeping a plurality of hint indexes in a hint index field of the hint table;

wherein the iterative operation comprises:

updating the current control parameter of the receiving circuit to a candidate control parameter, so that the receiving circuit processes an input signal according to the current control parameter to generate recovered data;

checking a relationship between a size of an optimized eye mask and a size of a current eye pattern corresponding to the recovered data;

maintaining the optimized eye mask and the optimized control parameter corresponding to the optimized eye mask when the optimized eye mask conflicts with the current eye pattern;

generating a new eye mask larger than the optimized eye mask according to the current eye pattern, updating the optimized eye mask to the new eye mask, and updating the optimized control parameter to the candidate control parameter corresponding to the new eye mask when the optimized eye mask does not conflict with the current eye pattern;

selecting a selected hint index from the hint indexes in the hint index field according to a starting hint index, an ending hint index and a hint index step;

extracting a plurality of parameter indexes corresponding to the selected hint index from a plurality of parameter index fields of the hint table, wherein the parameter indexes indicate a plurality of control parameters in a plurality of control parameter tables; and using the control parameters in the control parameter tables indicated by the parameter indexes as the candidate control parameter.

2. The eye pattern-based control parameter adjustment method as claimed in claim 1, further comprising performing fine optimization, wherein the fine optimization comprises:

calling the table sweep state machine to perform the iterative operation on a target table in the control parameter tables to determine an optimized index after sweeping a plurality of indexes in an index field of the target table; and for other tables in the control parameter tables except the target table, fetching a plurality of control parameters from the other tables to a plurality of functional circuits of the receiving circuit according to the parameter indexes corresponding to the optimized hint index in the hint table, wherein the iteration operation further comprises:

selecting a selected index from a plurality of indexes of the index field in the target table according to a starting index, an ending index, and an index step, wherein a plurality of control parameters of a parameter field in the target table are applicable to one of the functional circuits; and using a control parameter in the parameter field indicated by the selected index as a parameter of the candidate control parameter.

3. The eye pattern-based control parameter adjustment method as claimed in claim 2, further comprising performing perturbation optimization, wherein the perturbation optimization comprises:

calling a perturbation optimization state machine to perform a first-direction perturbation check on any target table of the control parameter tables starting from the optimized index, so as to decide whether to update the optimized index; and calling the perturbation optimization state machine to perform a second-direction perturbation check on the any target table starting from the optimized index, so as to decide whether to update the optimized index.

4. The eye pattern-based control parameter adjustment method as claimed in claim 1, wherein the iteration operation further comprises:

checking whether amplitude of the current eye pattern exceeds a threshold; and maintaining the optimized eye mask and the optimized control parameter corresponding to the optimized eye mask when the amplitude of the current eye exceeds the threshold.

5. A receiver device, comprising:

a receiving circuit, processing an input signal according to a current control parameter to generate recovered data; and a control circuit, coupled to the receiving circuit to provide the current control parameter, wherein the control circuit performs an iterative operation to determine an optimized control parameter, updates the current control parameter of the receiving circuit to the optimized control parameter after completing the iterative operation, and performs hint optimization;

wherein the hint optimization comprises:

calling a table sweep state machine to perform the iterative operation on a hint table to determine an optimized hint index after sweeping a plurality of hint indexes in a hint index field of the hint table;

wherein the iterative operation comprises:

updating the current control parameter of the receiving circuit to a candidate control parameter;

checking a relationship between a size of an optimized eye mask and a size of a current eye pattern corresponding to the recovered data;

maintaining the optimized eye mask and the optimized control parameter corresponding to the optimized eye mask when the optimized eye mask conflicts with the current eye pattern;

generating a new eye mask larger than the optimized eye mask according to the current eye pattern, updating the optimized eye mask to the new eye mask, and updating the optimized control parameter to the candidate control parameter corresponding to the new eye mask when the optimized eye mask does not conflict with the current eye pattern;

selecting a selected hint index from the hint indexes in the hint index field according to a starting hint index, an ending hint index and a hint index step;

extracting a plurality of parameter indexes corresponding to the selected hint index from a plurality of parameter index fields of the hint table, wherein the parameter indexes indicate a plurality of control parameters in a plurality of control parameter tables; and using the control parameters in the control parameter tables indicated by the parameter indexes as the candidate control parameter.

6. The receiver device as claimed in claim 5, wherein the control circuit further performs fine optimization, wherein the fine optimization comprises:

calling the table sweep state machine to perform the iterative operation on a target table in the control parameter tables to determine an optimized index after sweeping a plurality of indexes in an index field of the target table; and for other tables in the control parameter tables except the target table, fetching a plurality of control parameters from the other tables to a plurality of functional circuits of the receiving circuit according to the parameter indexes corresponding to the optimized hint index in the hint table, wherein the iteration operation further comprises:

selecting a selected index from a plurality of indexes of the index field in the target table according to a starting index, an ending index, and an index step, wherein a plurality of control parameters of a parameter field in the target table are applicable to one of the functional circuits; and using a control parameter in the parameter field indicated by the selected index as a parameter of the candidate control parameter.

7. The receiver device as claimed in claim 6, wherein the control circuit further performs perturbation optimization, wherein the perturbation optimization comprises:

calling a perturbation optimization state machine to perform a first-direction perturbation check on any target table of the control parameter tables starting from the optimized index, so as to decide whether to update the optimized index; and calling the perturbation optimization state machine to perform a second-direction perturbation check on the any target table starting from the optimized index, so as to decide whether to update the optimized index.

8. The receiver device as claimed in claim 5, wherein the iteration operation further comprises:

checking whether amplitude of the current eye pattern exceeds a threshold; and maintaining the optimized eye mask and the optimized control parameter corresponding to the optimized eye mask when the amplitude of the current eye exceeds the threshold.

\* \* \* \* \*